Figure 1:
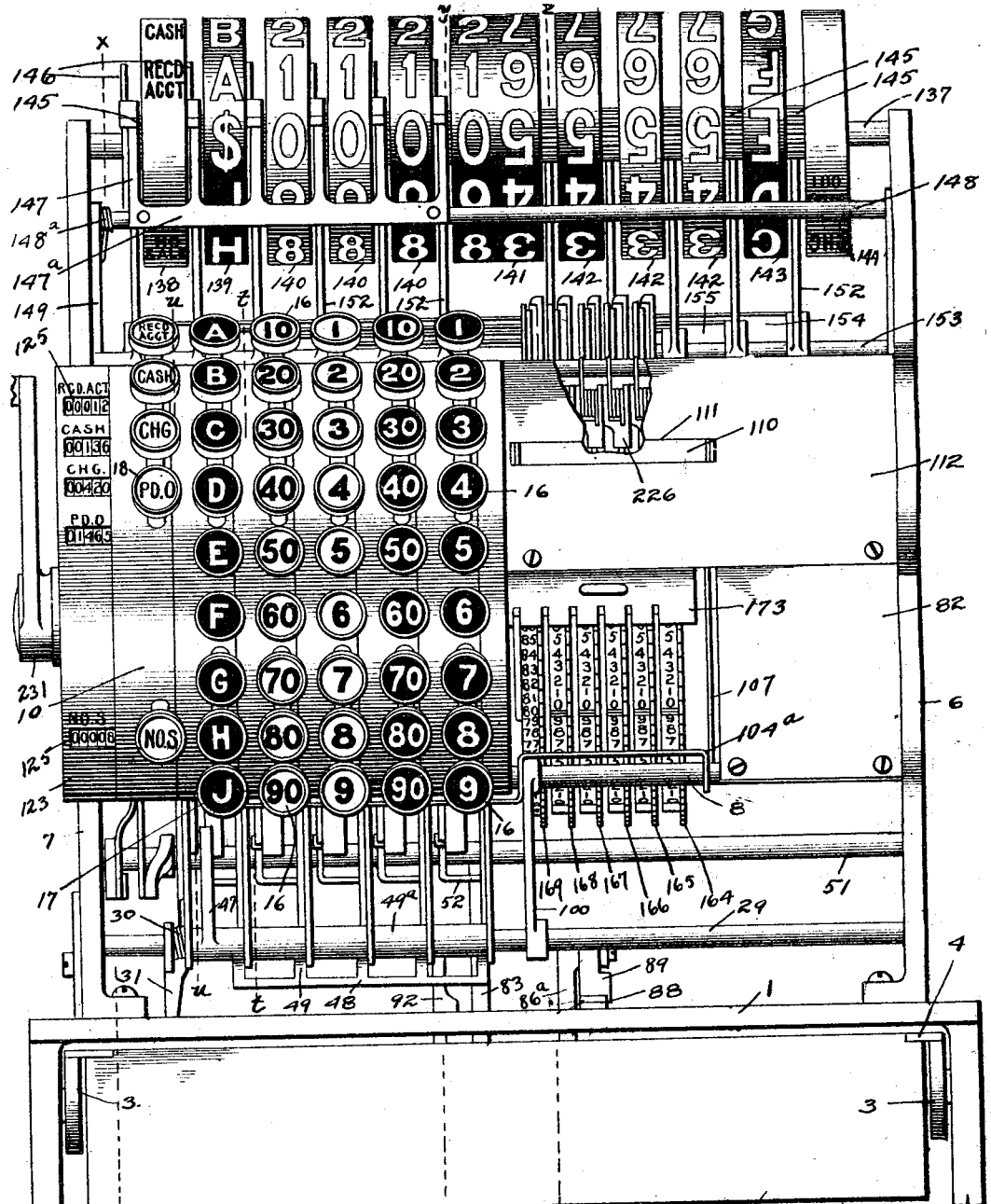

H. S. HALLWOOD.
CASH REGISTER.
APPLICATION FILED MAY 9, 1901.

1,085,681.

Patented Feb. 3, 1914.
25 SHEETS—SHEET 1.

WITNESSES:
J. H. Franck
A. Engensperger

INVENTOR
Henry S. Hallwood
BY
C. C. Shepherd
ATTORNEY

H. S. HALLWOOD.
CASH REGISTER.
APPLICATION FILED MAY 9, 1901.

1,085,681.

Patented Feb. 3, 1914.
25 SHEETS—SHEET 4.

WITNESSES:
J. H. Frank
A. Engensprigen

INVENTOR
Henry S. Hallwood
BY
C. Shepherd
ATTORNEY

H. S. HALLWOOD.
CASH REGISTER.
APPLICATION FILED MAY 9, 1901.

1,085,681.

Patented Feb. 3, 1914.
25 SHEETS—SHEET 5.

WITNESSES:

INVENTOR
Henry S. Hallwood
BY
ATTORNEY

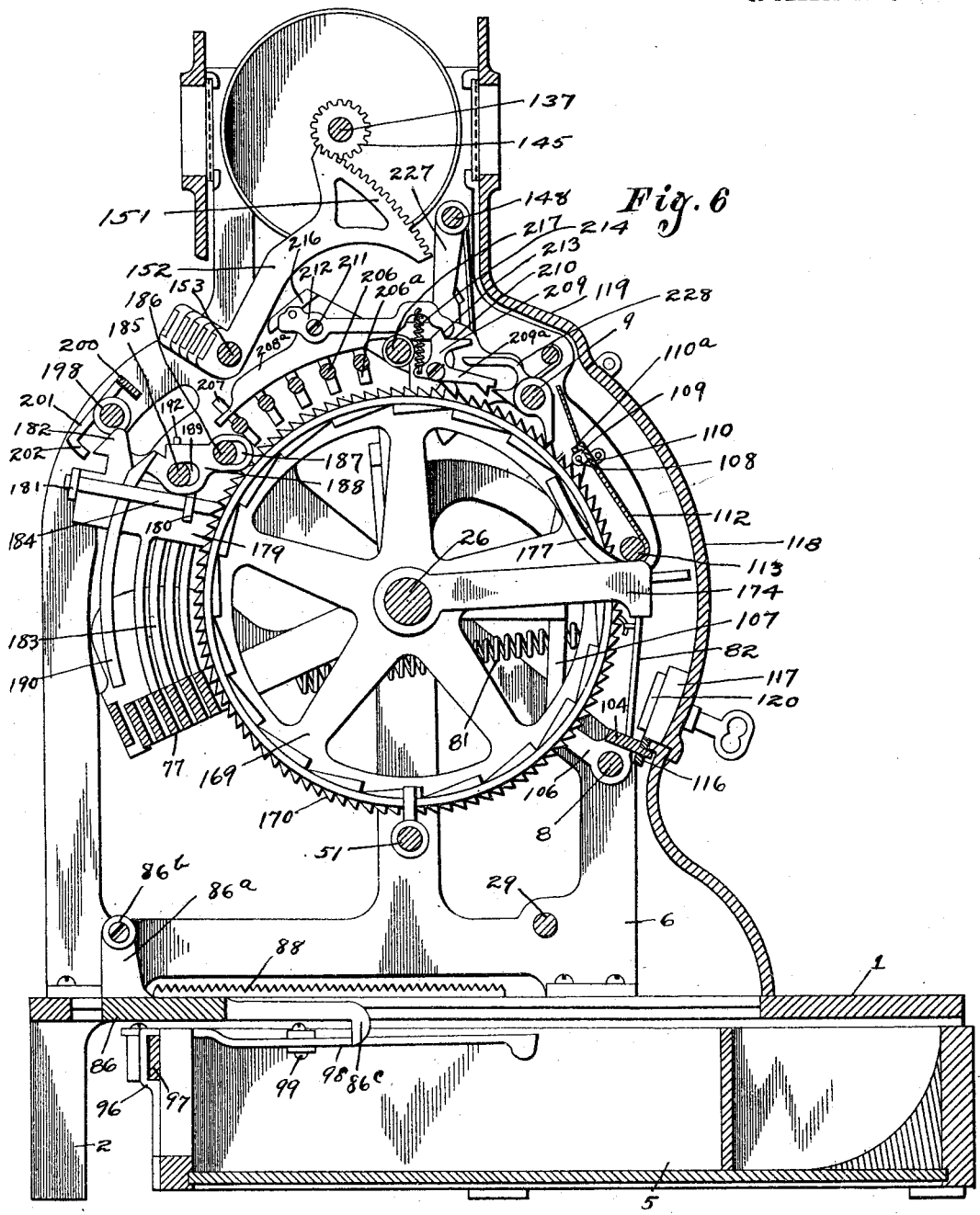

H. S. HALLWOOD.
CASH REGISTER.
APPLICATION FILED MAY 9, 1901.
1,085,681.
Patented Feb. 3, 1914.
25 SHEETS—SHEET 7.
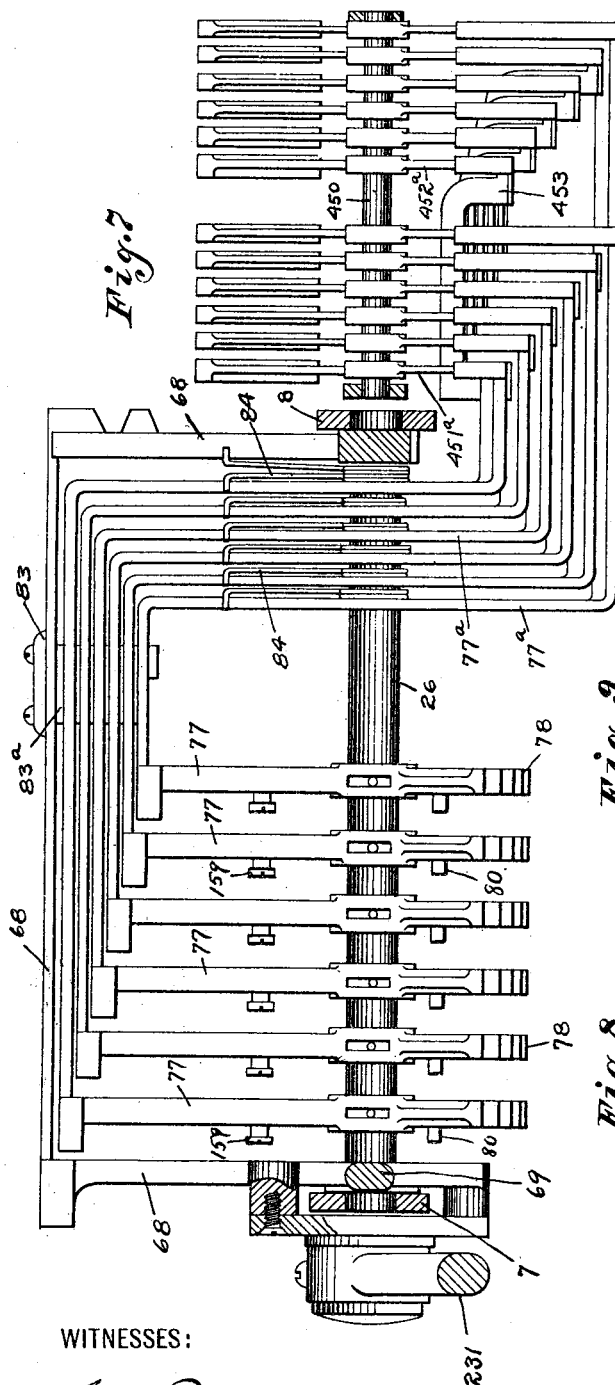
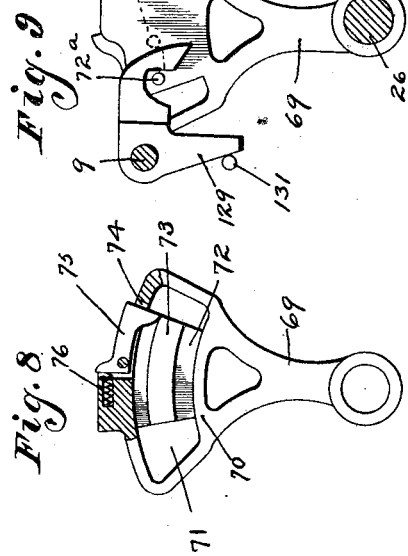
WITNESSES:
INVENTOR
Henry S. Hallwood
BY
ATTORNEY

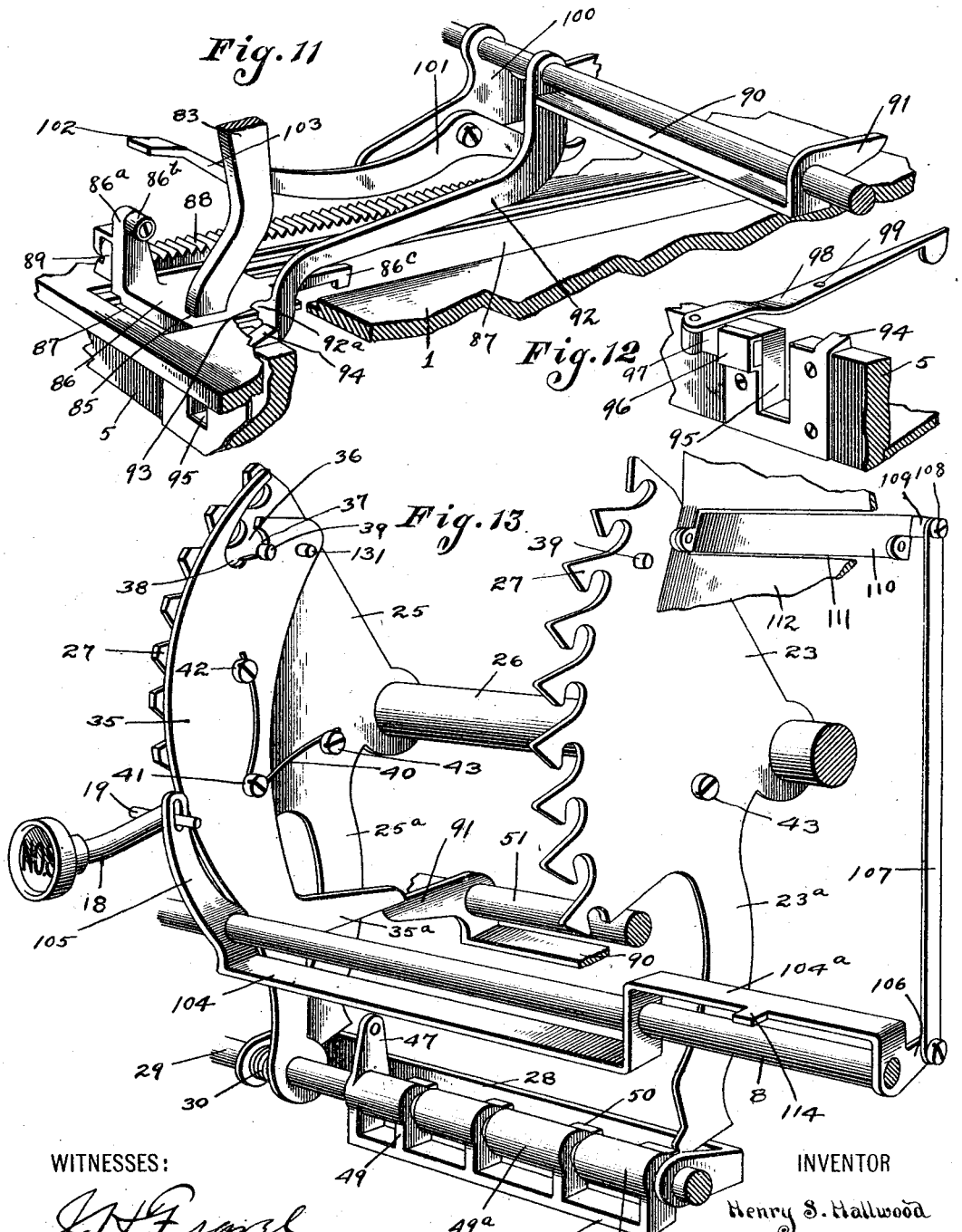

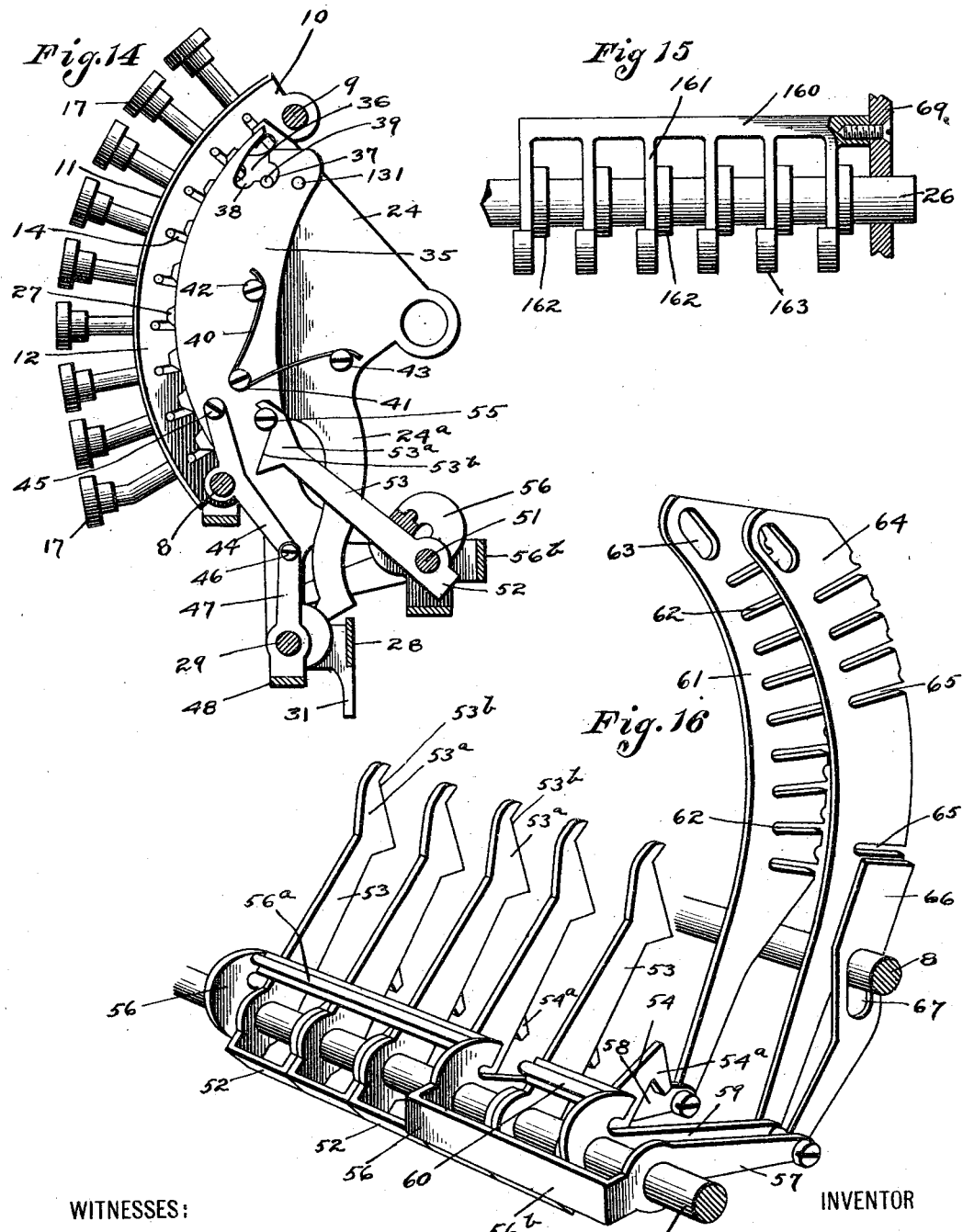

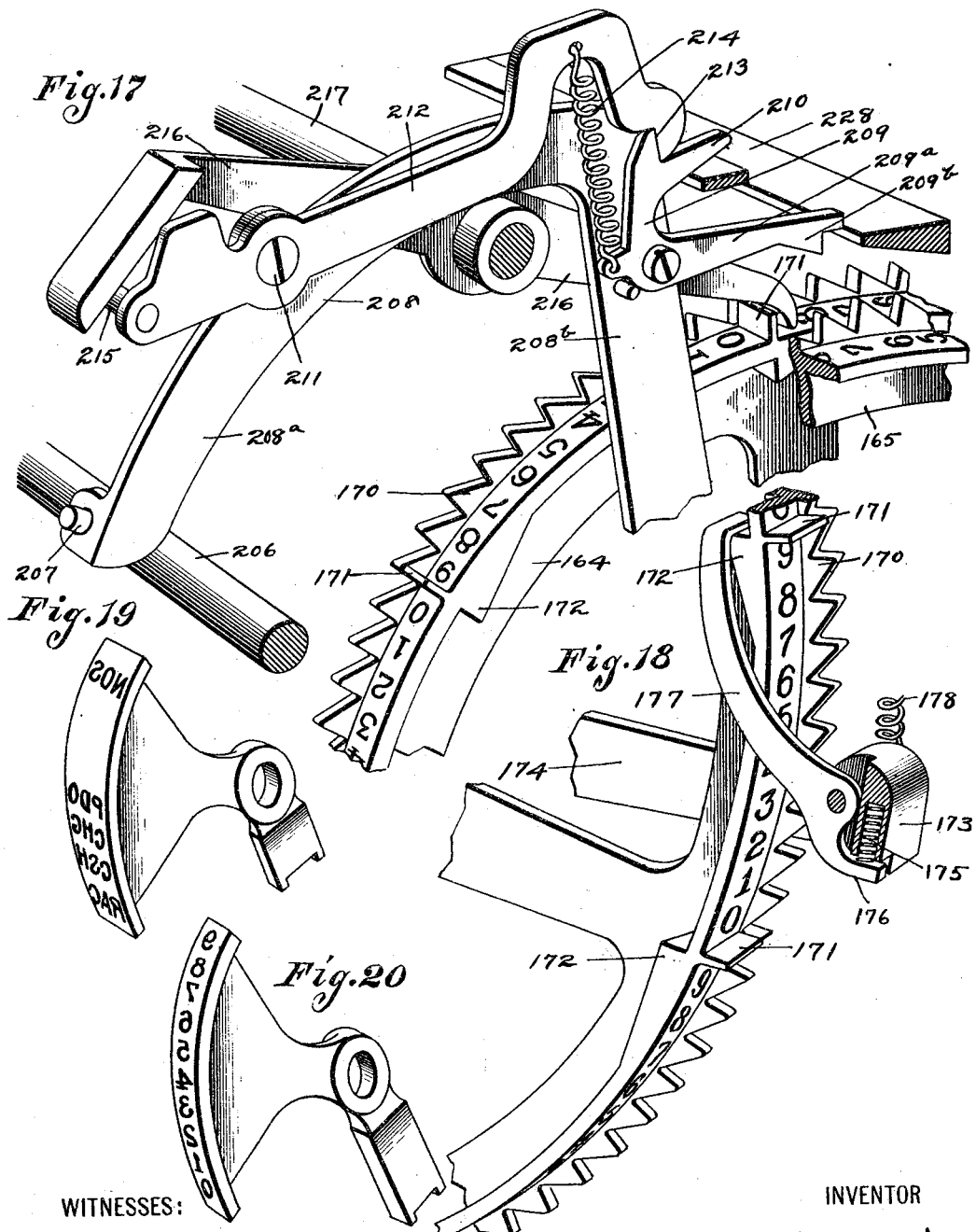

H. S. HALLWOOD.
CASH REGISTER.
APPLICATION FILED MAY 9, 1901.

1,085,681.

Patented Feb. 3, 1914.
25 SHEETS—SHEET 11.

WITNESSES:
J. H. Frank
A. Engensperger

INVENTOR
Henry S. Hallwood
BY
C. C. Shepherd
ATTORNEY

H. S. HALLWOOD.
CASH REGISTER.
APPLICATION FILED MAY 9, 1901.

1,085,681.

Patented Feb. 3, 1914.
25 SHEETS—SHEET 12.

WITNESSES:

INVENTOR
Henry S. Hallwood
BY
ATTORNEY

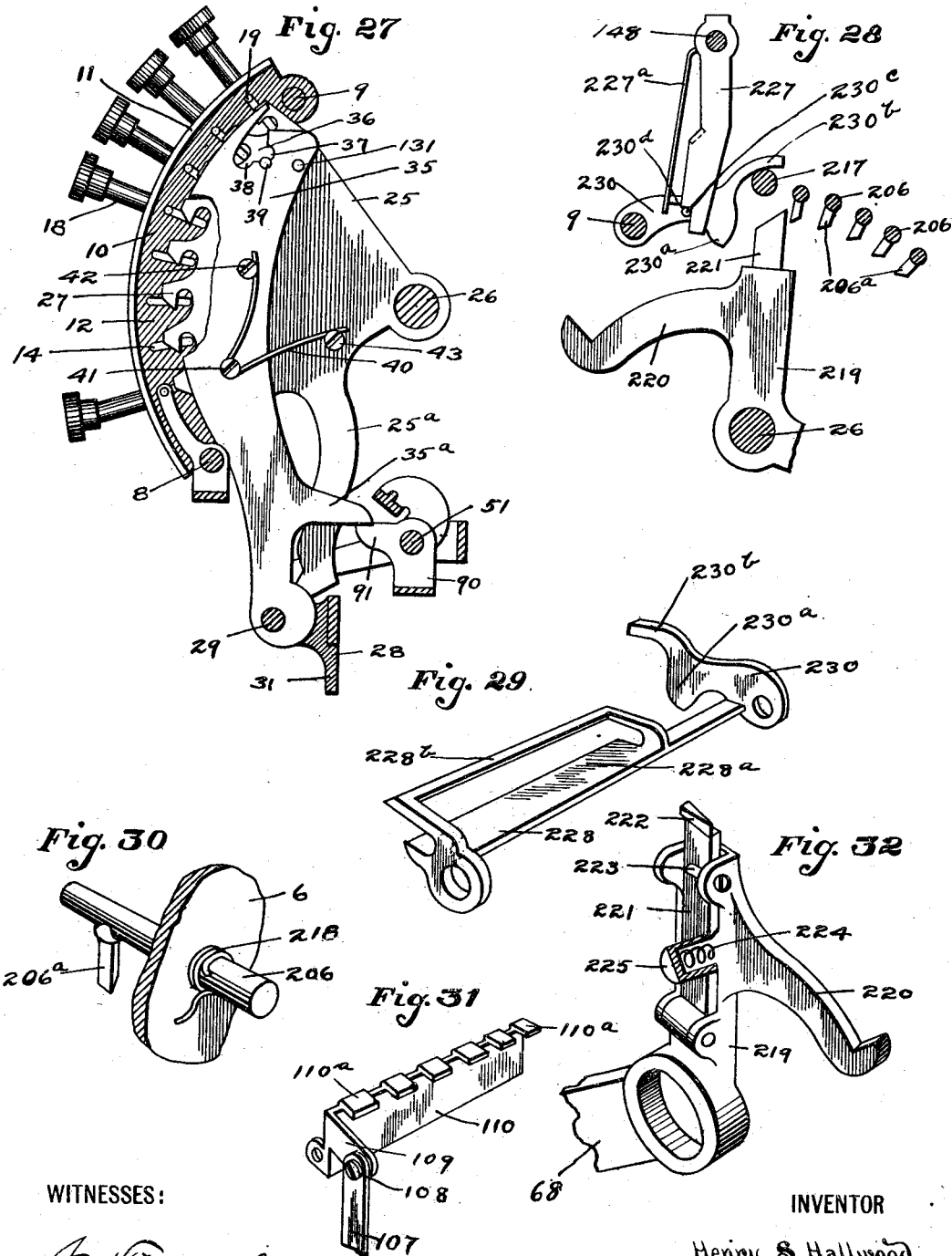

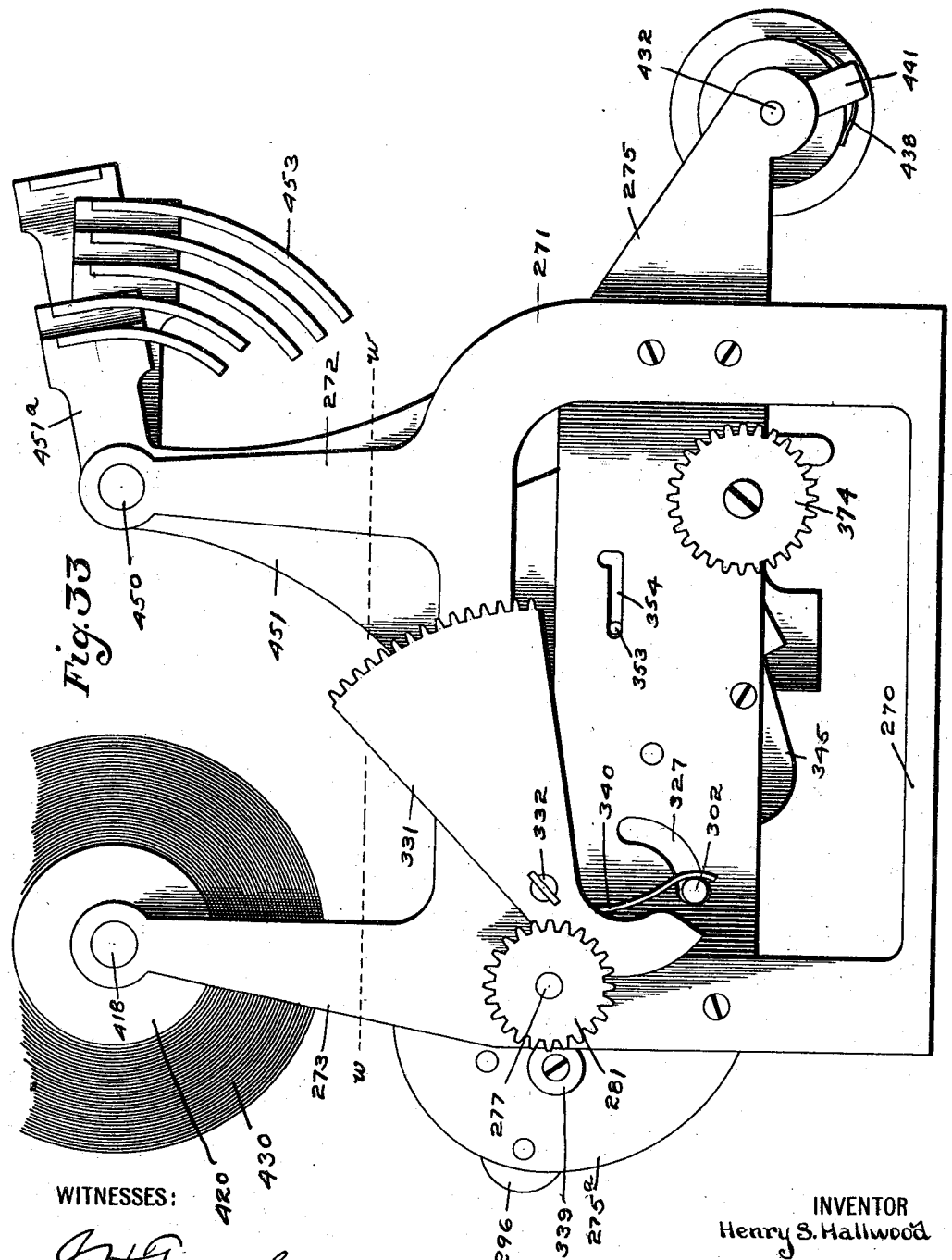

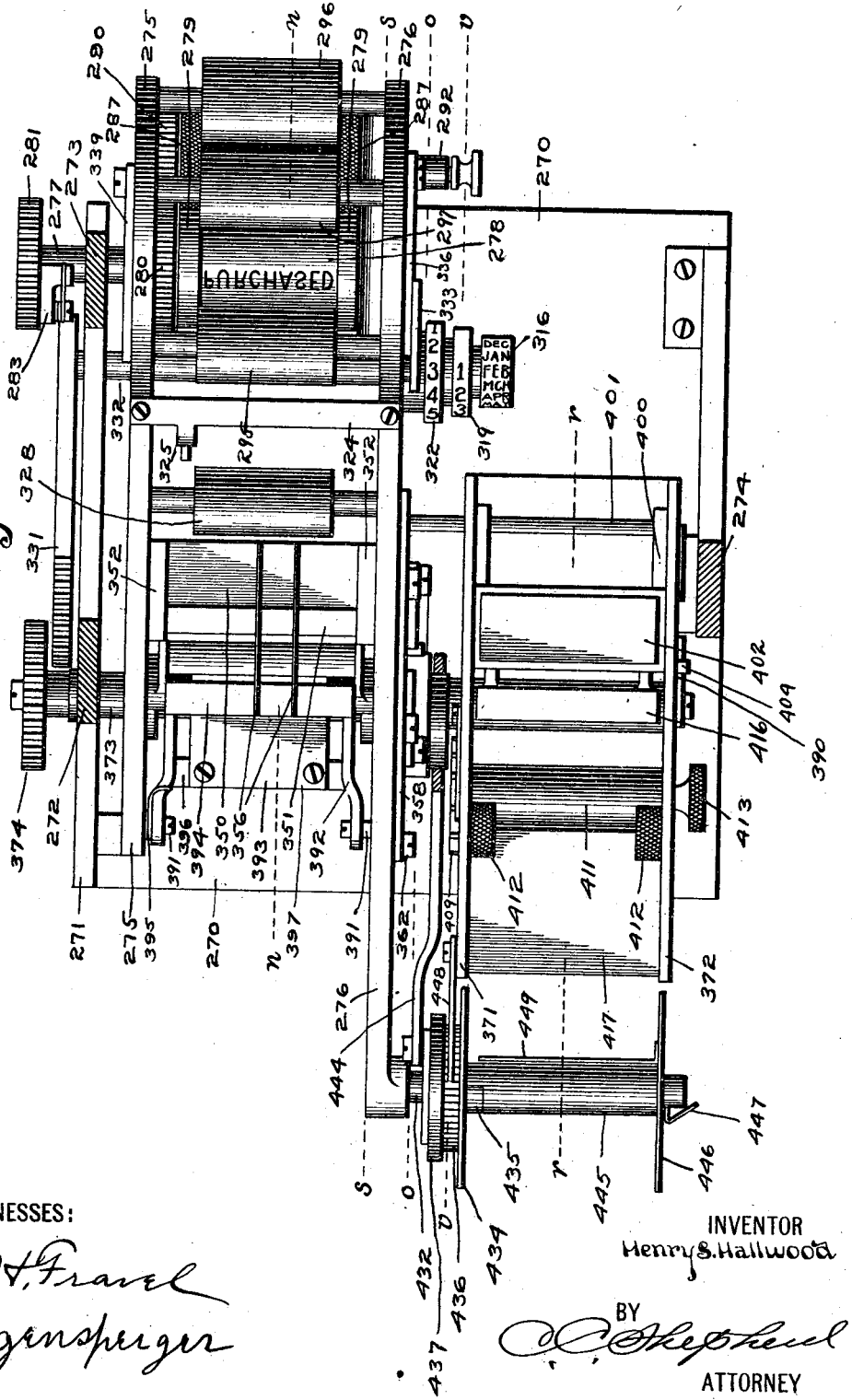

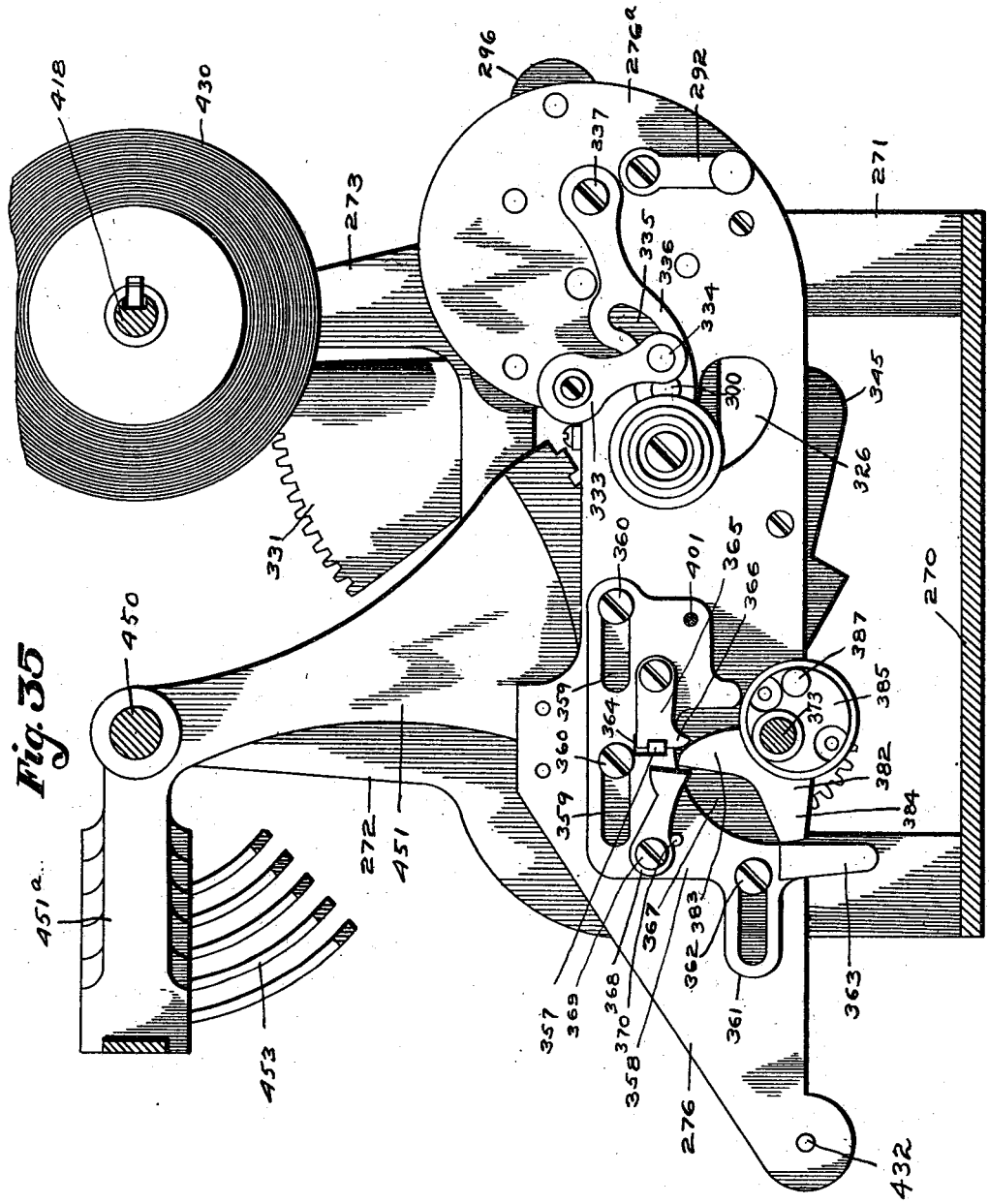

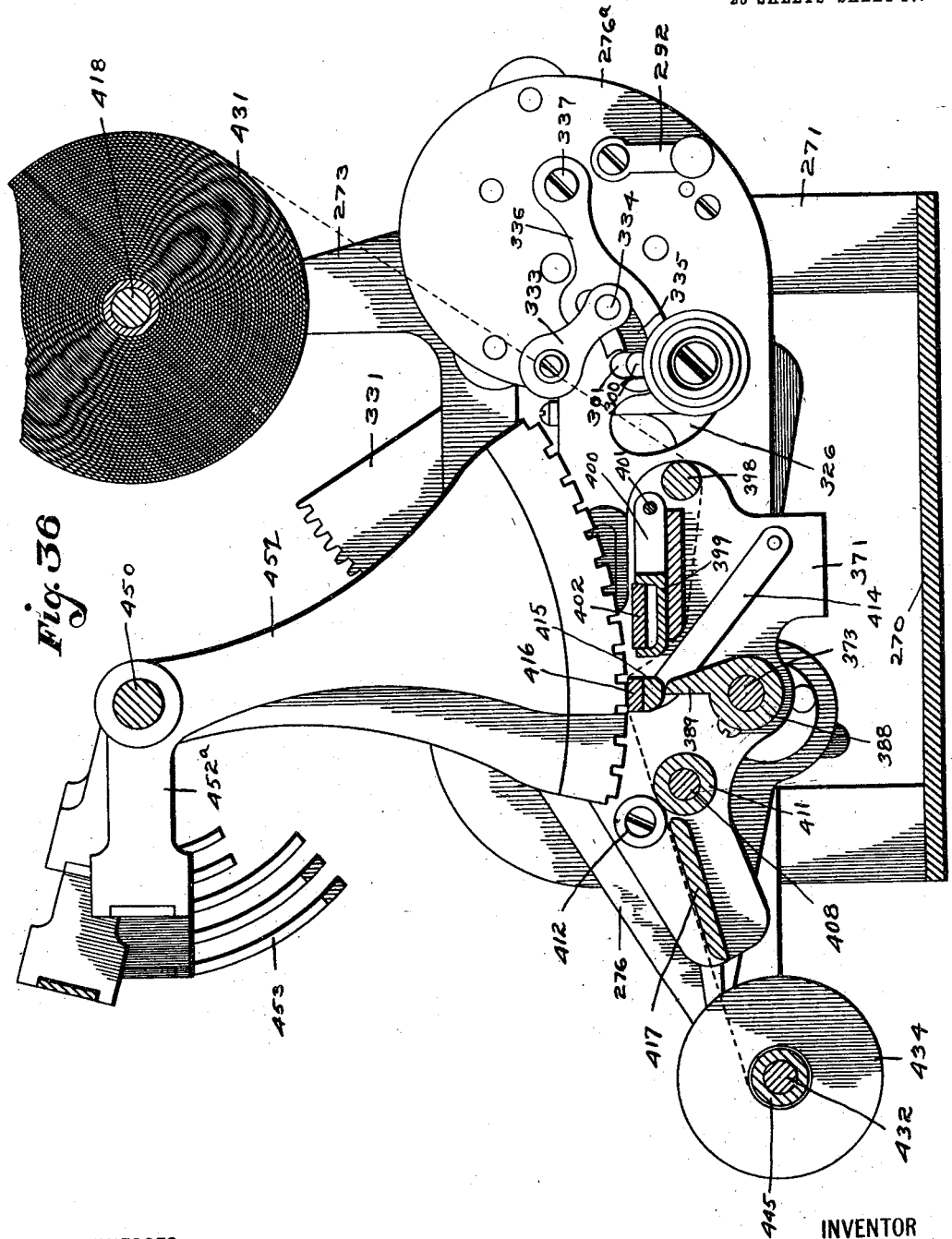

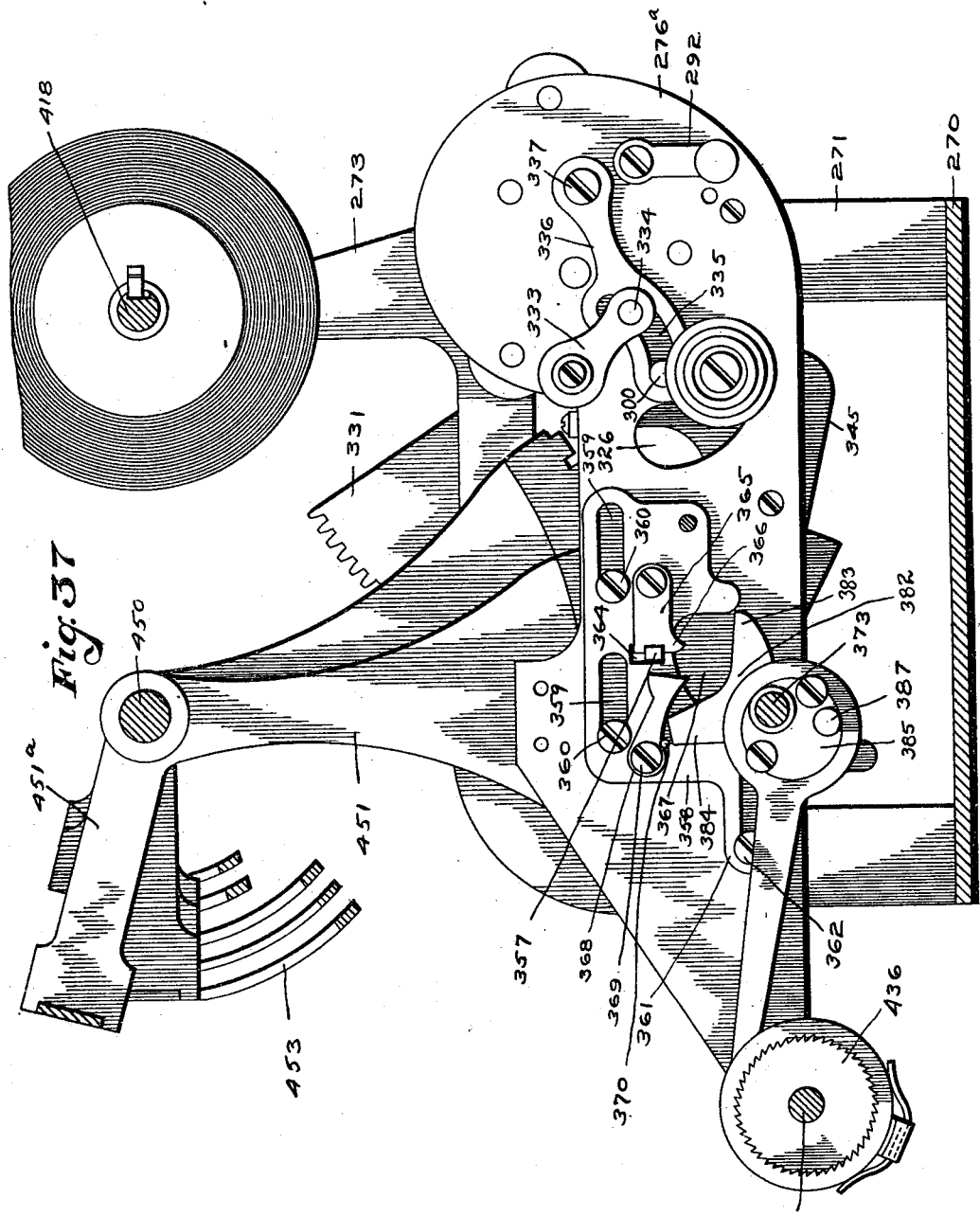

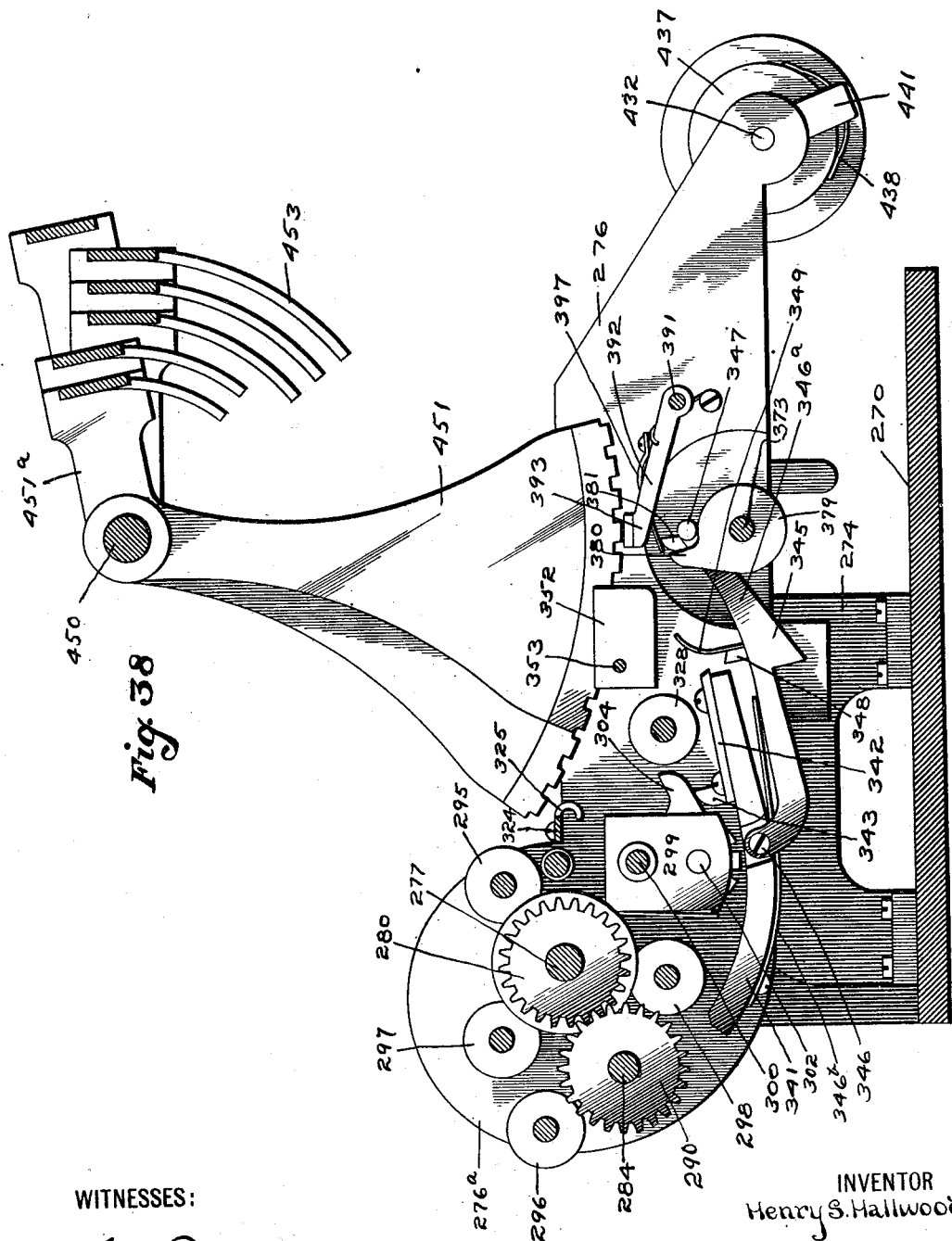

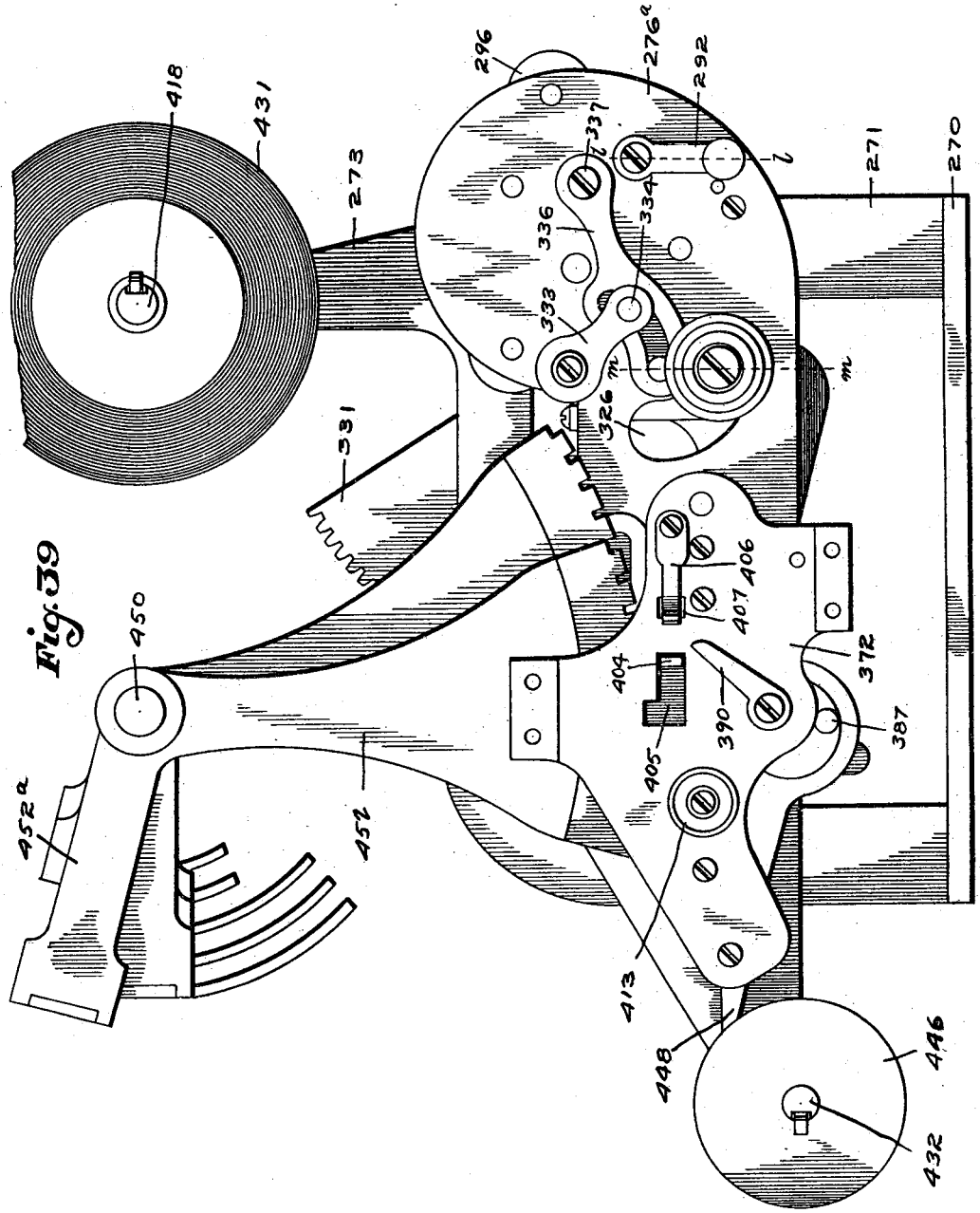

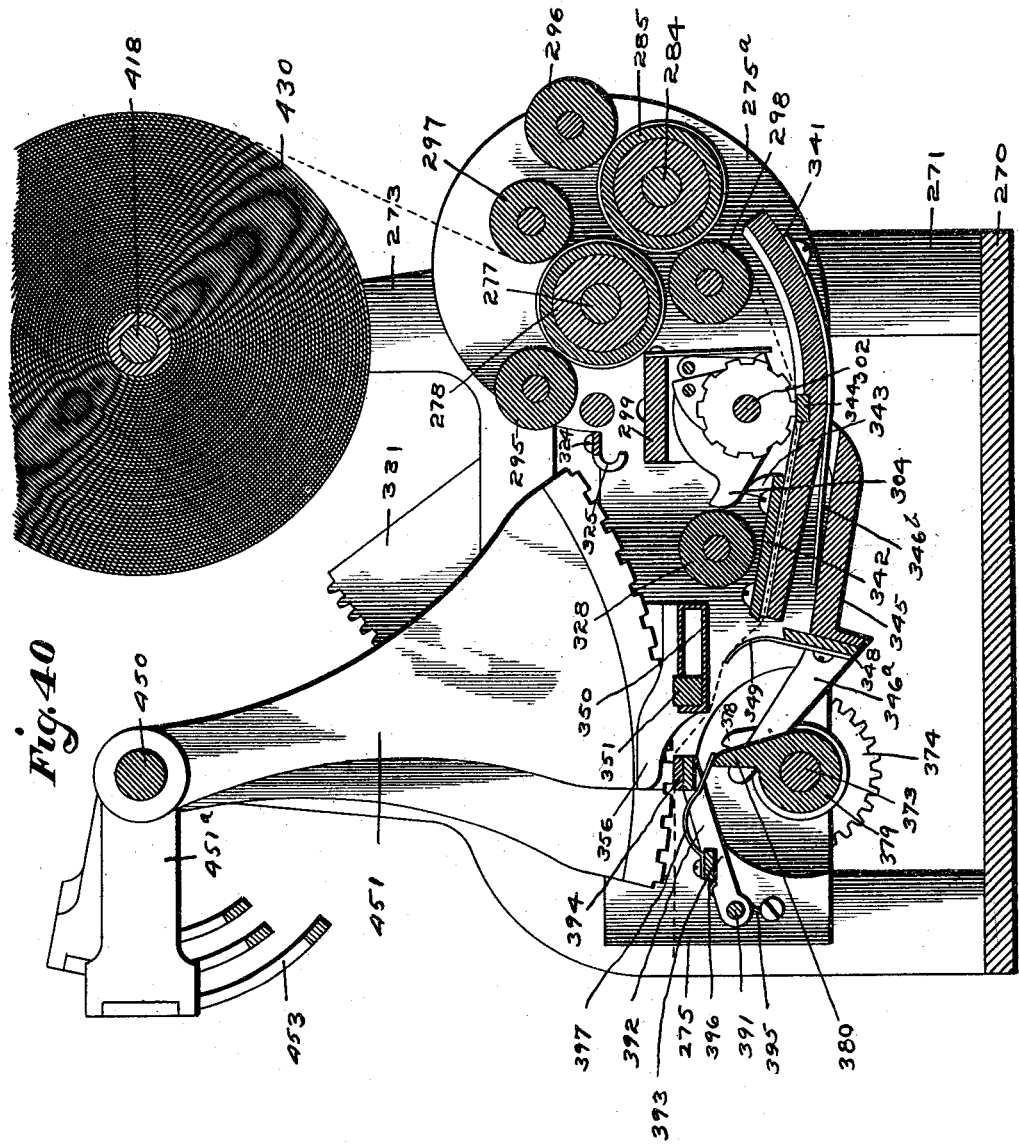

H. S. HALLWOOD.
CASH REGISTER.
APPLICATION FILED MAY 9, 1901.

1,085,681.

Patented Feb. 3, 1914.
25 SHEETS—SHEET 22.

WITNESSES:
J. H. Frank
A. Engensperger

INVENTOR
Henry S. Hallwood
BY
C. C. Shepherd
ATTORNEY

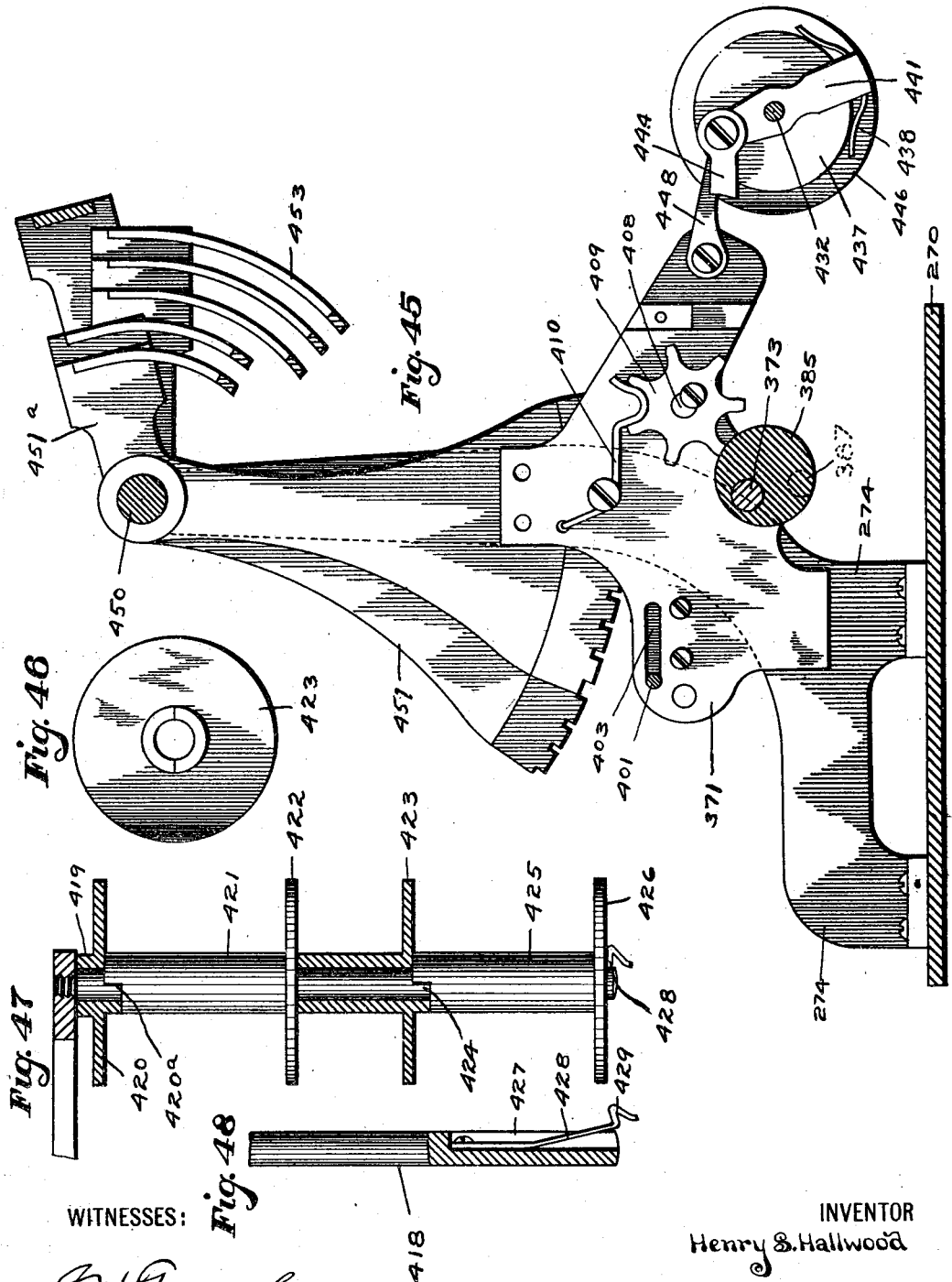

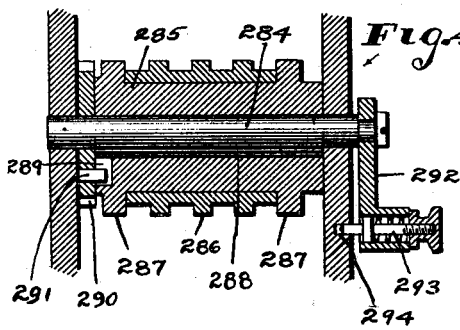
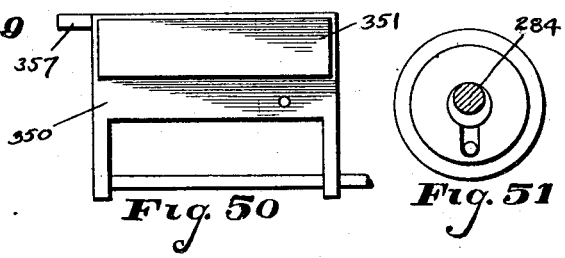
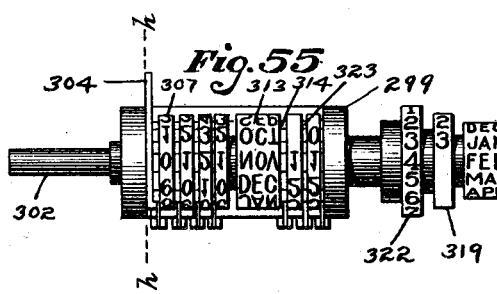
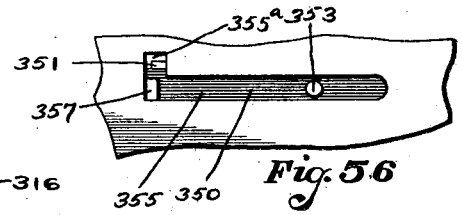
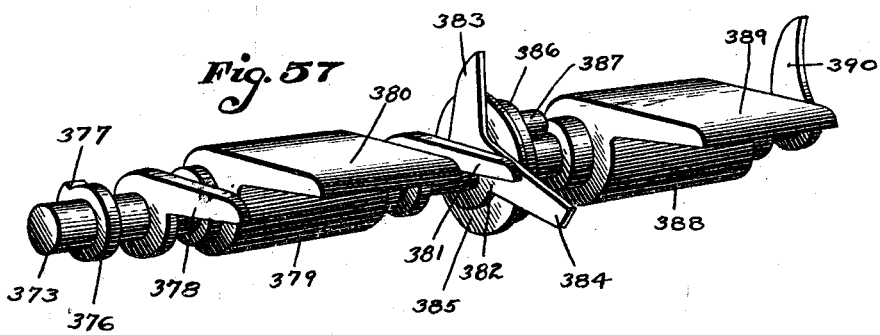

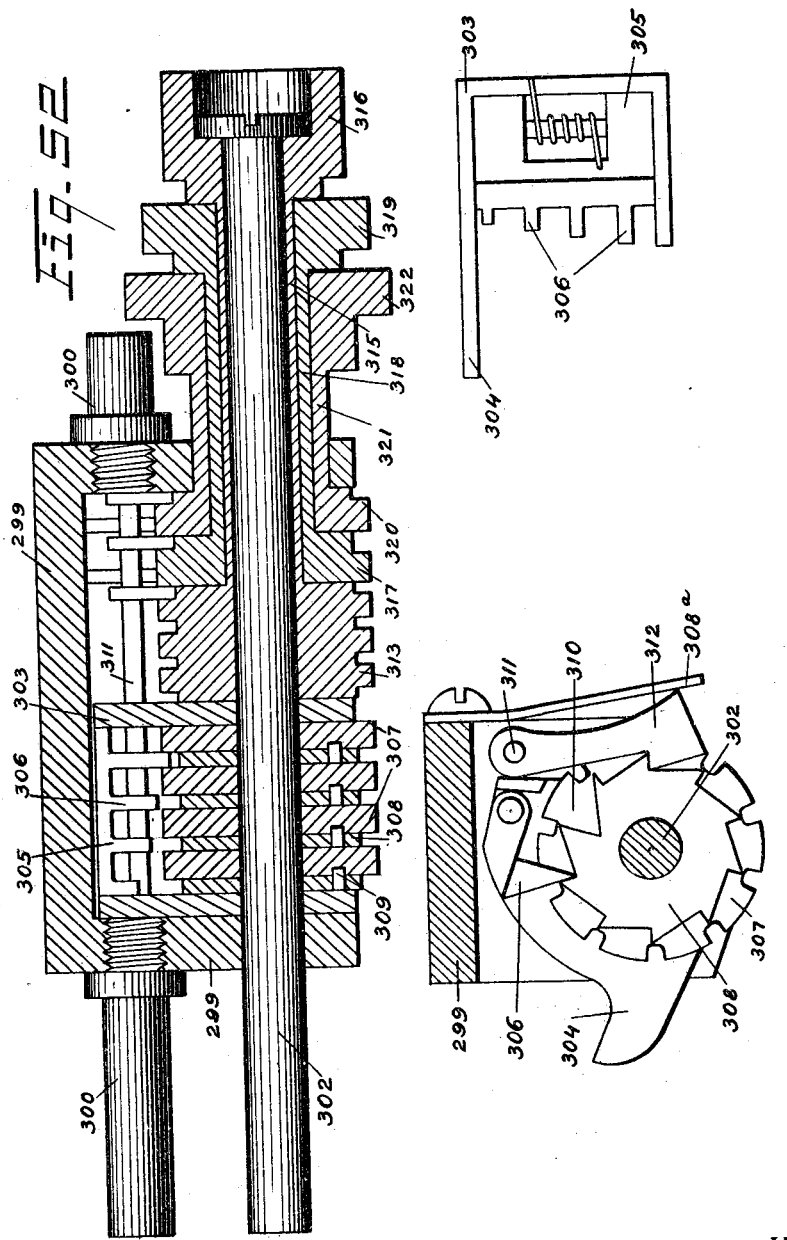

UNITED STATES PATENT OFFICE.

HENRY S. HALLWOOD, OF COLUMBUS, OHIO, ASSIGNOR, BY DIRECT AND MESNE ASSIGNMENTS, TO ANNIE HALLWOOD, OF COLUMBUS, OHIO.

CASH-REGISTER.

1,085,681.   Specification of Letters Patent.   Patented Feb. 3, 1914.

Application filed May 9, 1901. Serial No. 59,413.

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a specification.

My invention relates to the improvement of cash registers and the objects of my invention are to provide an improved cash register the registering mechanism of which may be operated through the manipulation of an operating lever without regard to the opening or closing of the cash drawer, or which registering mechanism may be operated by the drawer and independent of the said lever when desired; to provide improved mechanism whereby the operation of the operating lever may result in the closing of the cash drawer, or whereby said lever may be operated without exerting a closing influence on the drawer, thereby permitting, when desired, the drawer to remain open during a number of operations of the registering mechanism; to provide a cash register having value, initial and department keys with improved means necessitating the operation or depression of said keys in the order above named; to provide means for locking the no-sale key against operation after a value key has been depressed; to provide improved means whereby the value, initial and department keys are locked against operation after the no-sale key has been depressed; to provide mechanism whereby the value keys may be depressed and returned to their normal positions and re-depressed prior to the depressing of an initial key, and mechanism preventing the pressing and returning of the value keys after an initial or department key has been depressed; to provide improved means for indicating the amount of the transaction, the character of the same and the initial of the operator; to provide improved means for destroying previous indications upon the depressing of an initial key, thus making it compulsory to follow the depression of an initial key with the depression of a department key before a new indication can be made; to provide means whereby access to the registering wheels is prevented until the no-sale key has been depressed and to combine with said no-sale key interlocking mechanism; a registering cabinet door lock for recording each opening of said cabinet door; to provide improved means for recording each complete movement of the lever; to so construct my improved register as to admit of its being operated and utilized with the cash drawer entirely removed therefrom if desired; to provide improved means for indicating amounts paid out and charged and to prevent such amounts being registered or added upon the registering wheels; to provide an improved check printing and tape printing mechanism and to so construct the same as to admit of both said check and tape printers being employed jointly or independently; to provide means for locking the operated keys into operated positions and the unoperated keys into inoperative positions upon the depressing of a clerk's initial key and, connected therewith, locking mechanism whereby said clerk's initial key is locked into operative position and the balance of the initial keys are locked into inoperative position; to provide mechanism whereby the indications upon the registering wheels cannot be read until after the operation of the no-sale key or until the registering wheels have turned to indicate the addition of the last transaction. These objects I accomplish in the manner illustrated in the accompanying drawings, in which—

Figure 2:
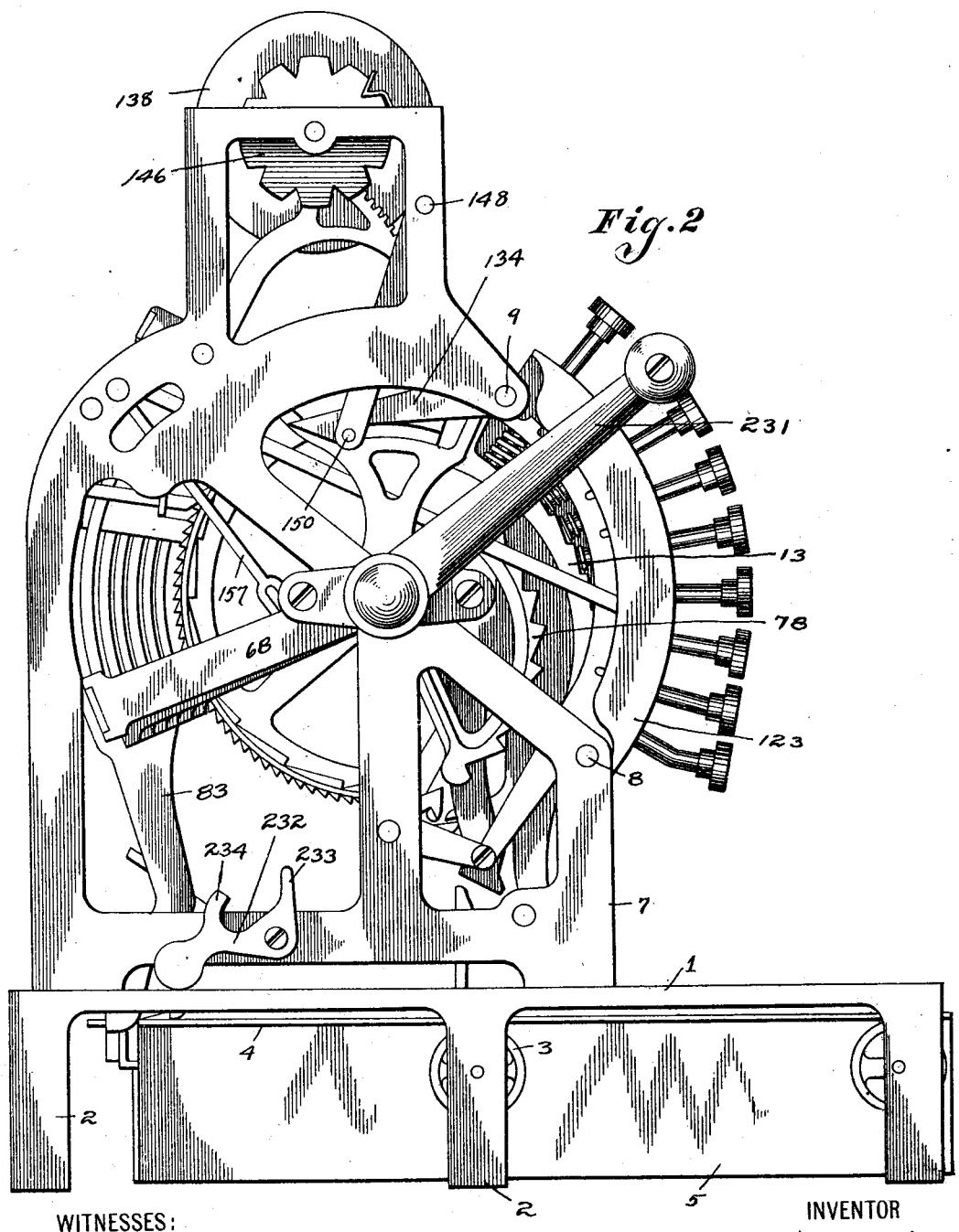
Figure 3:
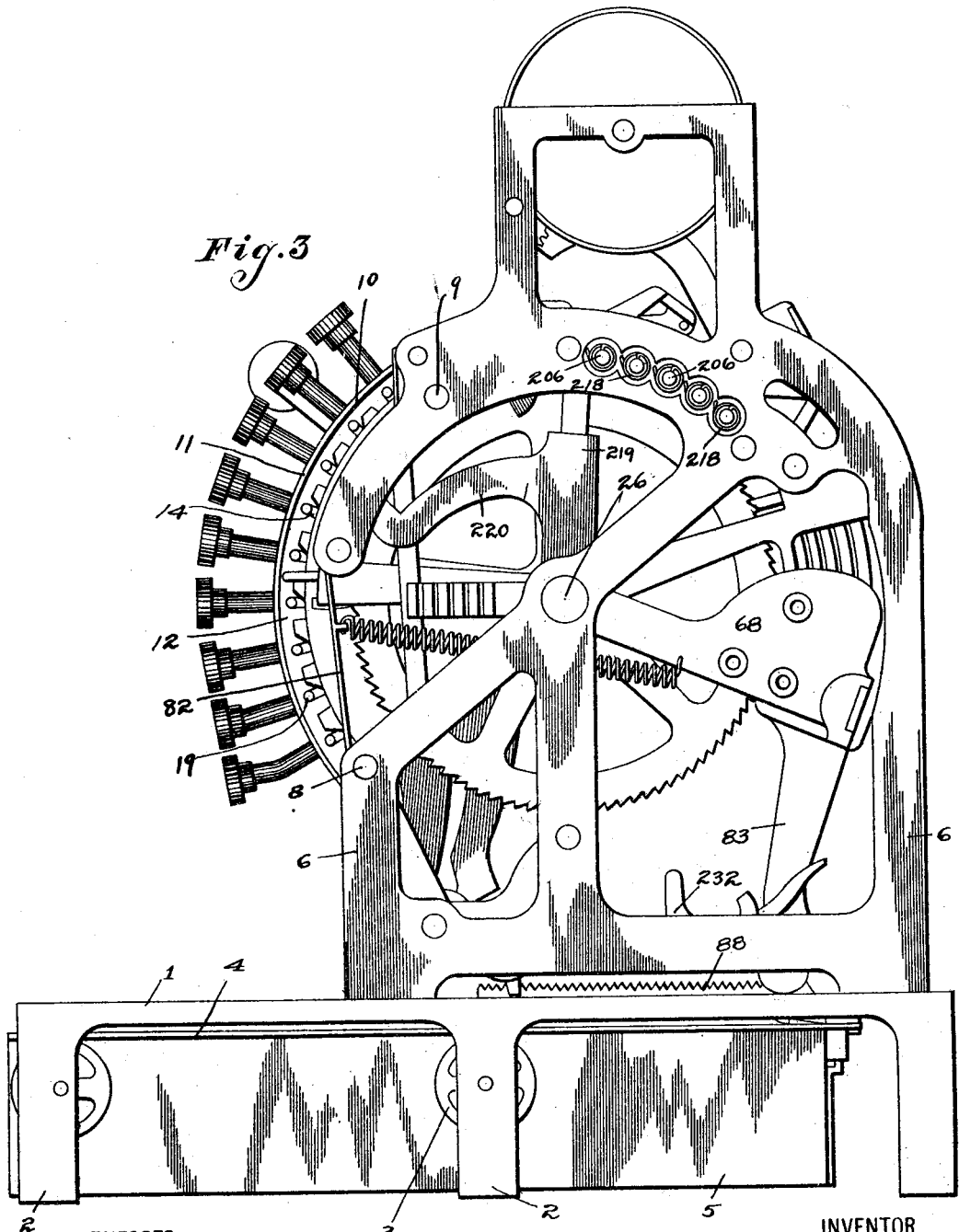
Figure 4:
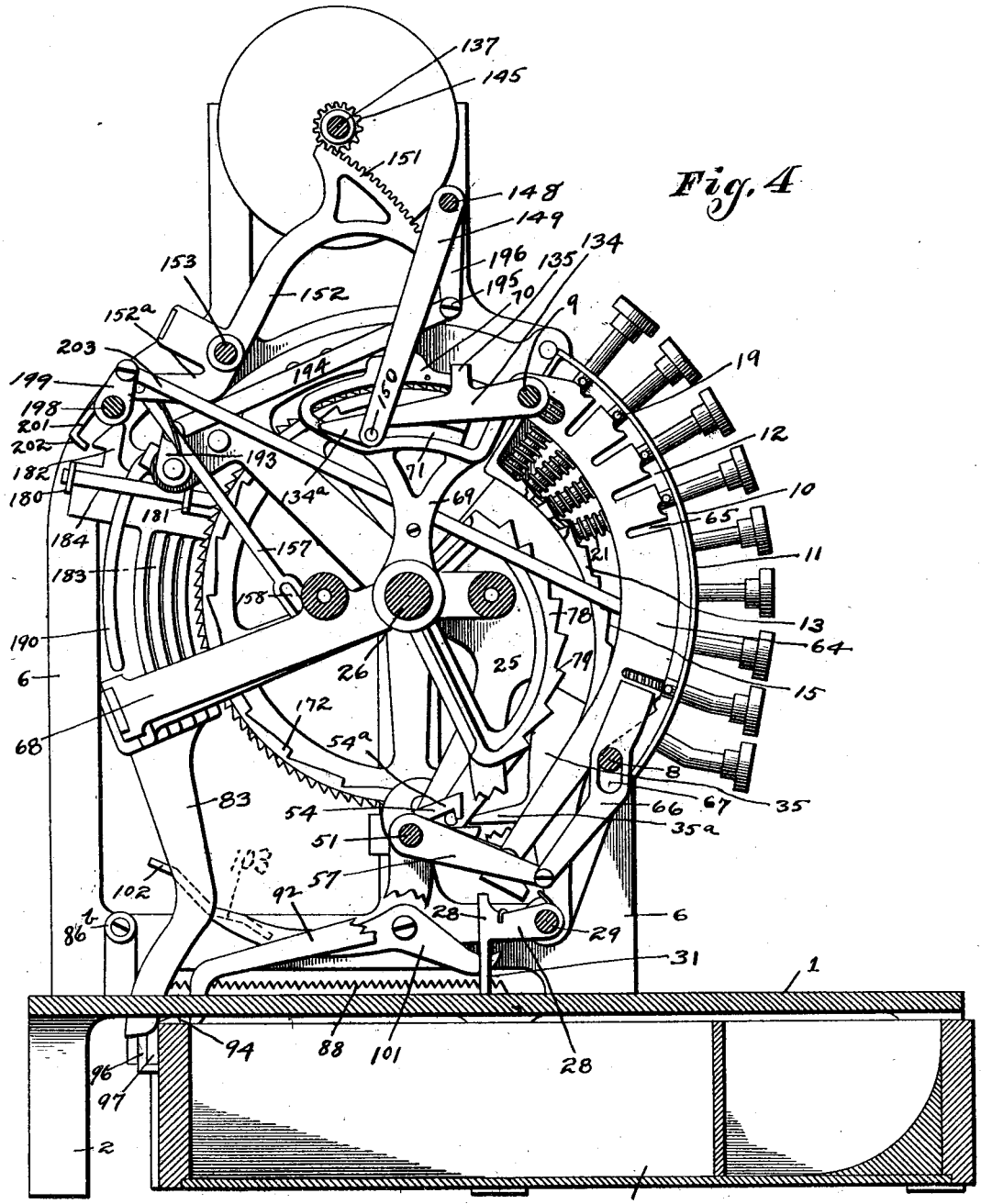
Figure 5:
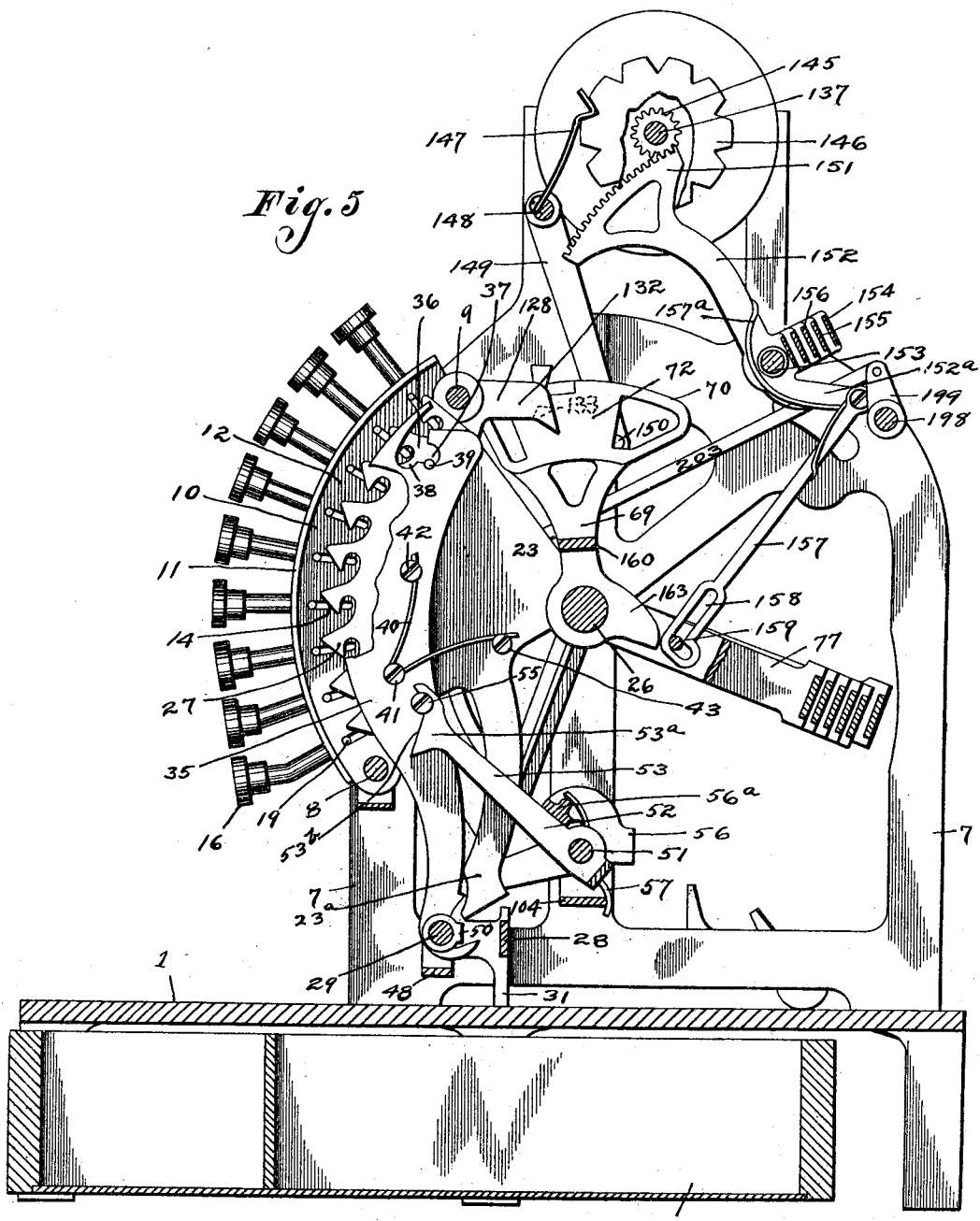
Figure 21:
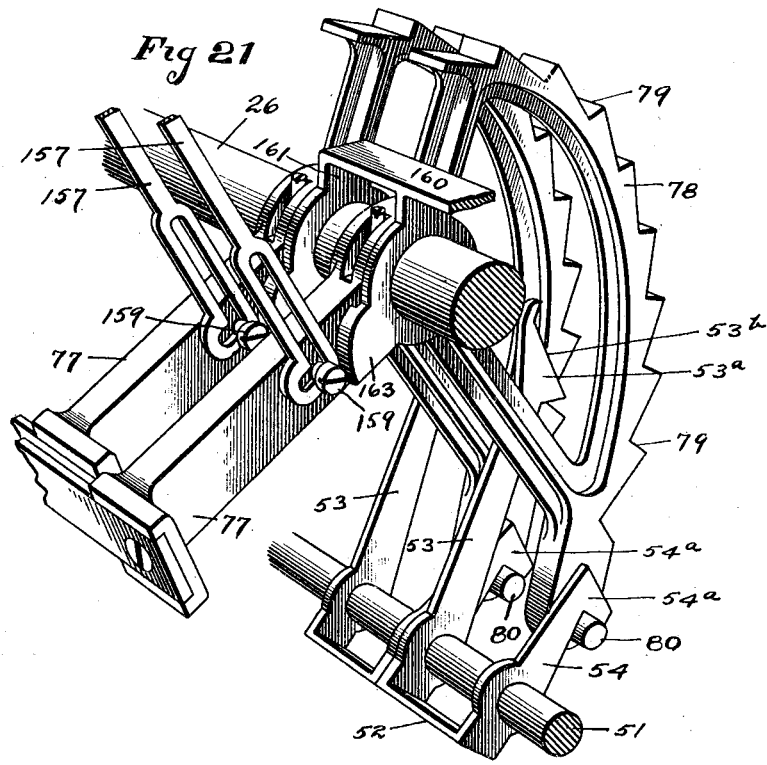
Figure 22:
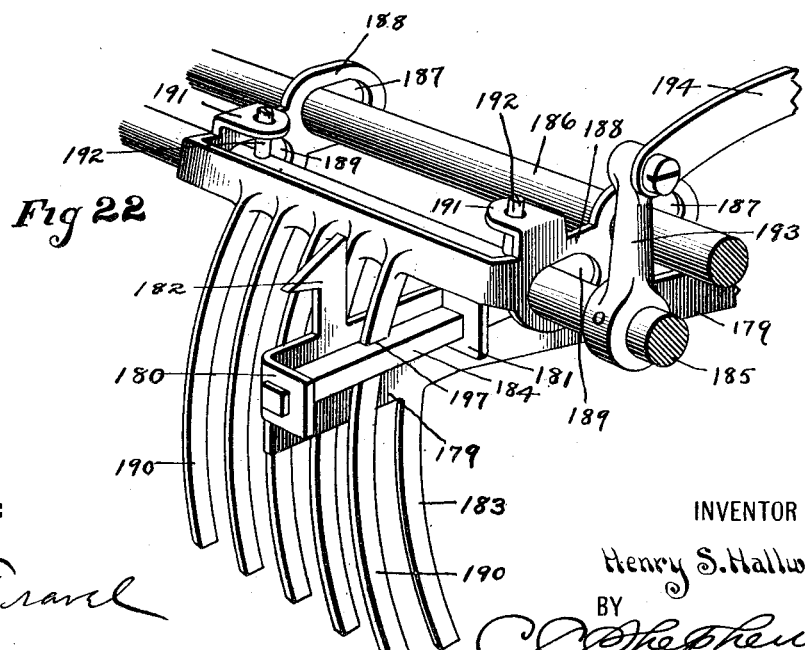
Figure 23:
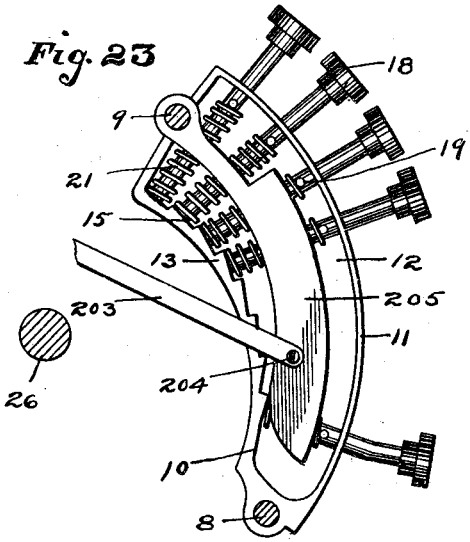
Figure 24:
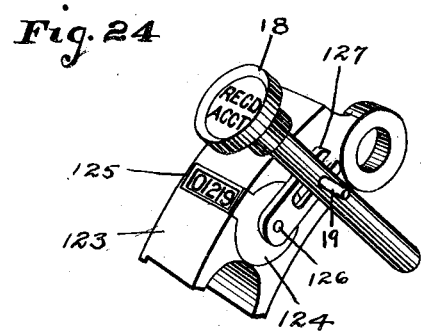
Figure 25:
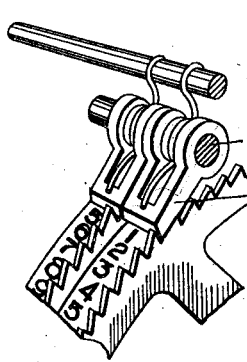
Figure 26:
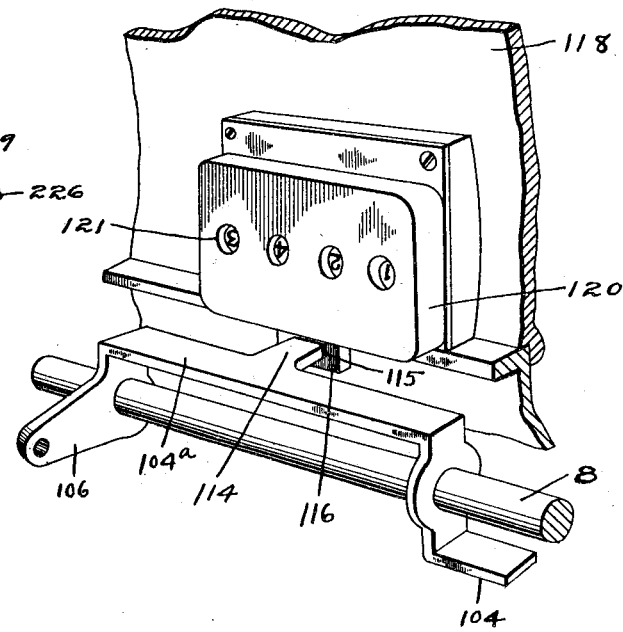
Figure 41:
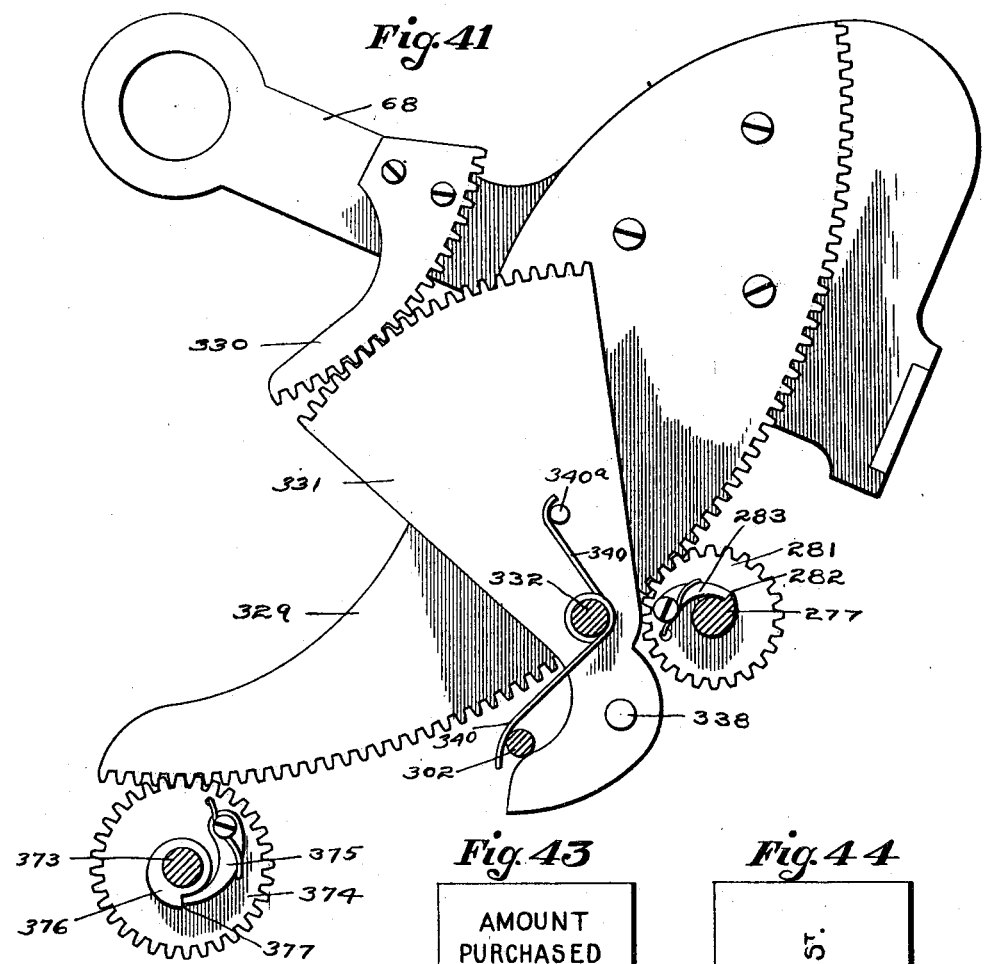
Figure 42:
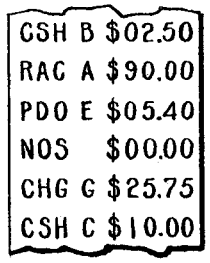
Figure 43:
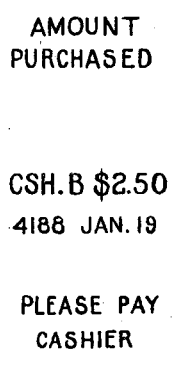
Figure 44:
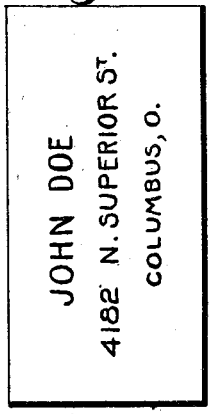

Figure 1 is a front elevation of my improved register with the case and printing mechanism removed therefrom for the sake of clearness in illustration. Fig. 2 is a view in elevation of that side of my improved register on which the operating lever is employed. Fig. 3 is a side elevation of the opposite side of the machine. Fig. 4 is a sectional view on line *x x* of Fig. 1. Fig. 5 is a section on line *y y* of Fig. 1. Fig. 6 is a section on line *z z* of Fig. 1. Fig. 7 is a detail plan view of the registering and printing segment carrying yokes. Fig. 8 is a view partially in section and partially in elevation of the target locking cam. Fig. 9 is a view in elevation of the cam finger and adjoining parts employed in compelling the return of the department and initial keys to their normal positions after operation. Fig. 10 is a view in perspective of the cam finger shown in Fig. 9, the target releasing lever being shown in conjunction therewith. Fig. 11 is a detail view in perspective of the drawer locking and releasing mechanism. Fig. 12 is a detail view in perspective of the device for changing the machine from a lever to a drawer operated machine or vice-versa. Fig. 13 is a detail view in perspective of the key and plate locking mechanism showing, in conjunction therewith, means for preventing the reading of the registering wheels until the no-sale key is depressed. Fig. 14 is a detail sectional view on line $t$ $t$ of Fig. 1. Fig. 15 is a partial rear elevation and partial section of a cam frame employed in connection with the indicating mechanism. Fig. 16 is a detail view in perspective of a key interlocking mechanism. Fig. 17 is a detail view in perspective of a portion of the transfer mechanism. Fig. 18 is a detail view in perspective of a portion of one of the registering wheels showing the resetting mechanism in connection therewith. Fig. 19 is a detail view in perspective of the department printing segment. Fig. 20 is a similar view of an amount printing segment. Fig. 21 is a view in perspective of two of the registering wheel operating pawl controlling segments showing in connection therewith a portion of the cam frame illustrated in Fig. 15. Fig. 22 is a perspective view of one of the pawl carrying arms and its connected parts. Fig. 23 is a side elevation of the key frame showing the department keys and in conjunction therewith the means for preventing the adding of the amounts charged and paid out. Fig. 24 is a detail view in perspective of a key counter showing its connection with the key. Fig. 25 is a similar view of portions of two registering wheels and the wheel holding pawls. Fig. 26 is a similar view of the inner side of the case lid or door showing my improved lid lock and counter in connection therewith. Fig. 27 is a section on line $u$ $u$ of Fig. 1. Fig. 28 is a partial elevation and partial sectional view showing the relative positions of the transfer rods, depending triggers and tripping device. Fig. 29 is a detail view in perspective of a locking and resetting frame employed in connection with the transfer mechanism. Fig. 30 is a similar view of the outer end portion of one of the transfer rods and its spring connection with the frame. Fig. 31 is a similar view of the shutter or shield which I employ in the manner hereinafter described for preventing the reading of the registering wheels. Fig. 32 is a similar view of a spring actuated trip employed in the manner hereinafter described in connection with the transfer mechanism. Fig. 33 is an inner side elevation of the tape and check printer. Fig. 34 is a sectional view of said tape and check printer frame taken on line $w$ $w$ of Fig. 33. Fig. 35 is a sectional view taken on line $v$ $v$ of Fig. 34. Fig. 36 is a sectional view on line $r$ $r$ of Fig. 34. Fig. 37 is a sectional view taken on line $v$ $v$ of Fig. 34, showing a side elevation of the check printer. Fig. 38 is a sectional view of the check printer on line $s$ $s$ of Fig. 34. Fig. 39 is an outer side elevation of the tape printing mechanism with the side frame removed for clearness of illustration. Fig. 40 is a sectional view on line $n$ $n$ of Fig. 34. Fig. 41 is an outer side view of the check and tape printer operating gears. Fig. 42 is a view in elevation of a portion of a printed tape. Fig. 43 is a similar view showing one side of a printed check. Fig. 44 is a view of the opposite side thereof. Fig. 45 is a sectional view on line $o$ $o$ of Fig. 34. Fig. 46 is an end elevation of the paper reel with the outer reel section removed. Fig. 47 is a partial elevation and a partial section of said paper reel. Fig. 48 is a longitudinal section of the outer portion of a paper reel supporting shaft. Fig. 49 is a sectional view on line $l$ $l$ of Fig. 39. Fig. 50 is a plan view of the printing segment inking device. Fig. 51 is an end elevation of the printing roll illustrated in Fig. 49. Fig. 52 is a sectional view through the numbering and dating mechanism taken on line $m$ $m$ of Fig. 39. Fig. 53 is a transverse section on line $h$ $h$ of Fig. 55. Fig. 54 is a plan view of a yoke and spring actuated pawl body employed in the numbering mechanism of the check printer. Fig. 55 is an underside view in elevation of the numbering and dating mechanism. Fig. 56 is a side elevation of a portion of the outer side plate of the check printer and Fig. 57 is a detail view in perspective of the tape and check printer operating cams.

Similar numerals refer to similar parts throughout the several views.

In carrying out my invention I employ a base portion comprising a horizontal base plate 1, from the sides of which depend frame arms 2, said frame arms having pivoted on their inner sides wheels 3. Upon these wheels rest and slide the laterally projecting top flanges 4 of a cash drawer 5. From opposite sides of the base plate 1 rise vertical frame standards 6 and 7. These end or side frame standards are connected at suitable points in the manner hereinafter described by frame rods. Of these frame rods, 8 and 9 extend transversely between the forward portions of the frame standards and, at one side of the center of the machine, support a key frame 10. This key frame consists of an outwardly curved or bowed face plate 11 which is formed of adjoining sections and which has formed on its inner side at intervals inwardly projecting parallel wings or ribs 12. Each of the wings 12 has its inner portion formed with a laterally projecting shoulder 13 (see Fig. 4) and each of said wings has formed therein radially arranged slotted openings 14. The curved shoulders 13 are provided with successively arranged stops or notches as indicated at 15.

16 represent the value keys which are arranged one above the other and in parallel rows which extend from the right side of the key frame plate toward the left. To the left of these value keys are banks of special keys consisting of a row of initial or identification keys 17 and, to the left of the latter, a row or partial row of department keys 18, on the heads of which are printed words or abbreviations of words indicating the character of the transaction, such as received on account, cash, charge, paid out and no-sale. The heads of the value keys are numbered to represent different amounts, the row to the right being numbered in the present case from one to nine inclusive and indicating cents; the row to the left thereof indicating cents in multiple of ten and the next rows to the left indicating dollars and tens of dollars respectively. Each of the initial keys 17 is provided with a letter on its head, this numbering and lettering of the keys being shown more clearly in Fig. 1. The stems of all the keys pass loosely through openings in the face plate 11 adjacent to the sides of the wings 12 and are provided on the inner side of said face plate with projecting transverse pins 19. The pins 19 of the value keys and initial keys project only on one side of said keys, while the corresponding pins of the department keys project, for the reasons hereinafter shown, on both sides thereof. The inner end portions of the key stems extend loosely, as indicated in Fig. 4, within radially arranged openings in the steps or notched portions 15 of the shoulders 13. Between the pins 19 and said shoulders 13, and surrounding the key stems, are coiled springs 21 which normally retain said keys in their outer positions.

23, 24 and 25 respectively represent lock plates of which there is one for each set or row of value, initial and department keys, the lock plates of the two latter keys being indicated at 24 and 25. Each of these lock plates has the general form of a battle ax and has it head portion at its rear side fulcrumed on a central or main shaft 26 which extends between the end standards 6 and 7 of the machine frame. In this manner the lock plates are so supported as to bring the forward portion of one of the same adjacent to each of the key frame wings 12. This forward edge of each of the lock plates is curved to conform to the curvature of said wings and said curved edge has formed thereon hook shaped projections, which are indicated at 27. The points of these hooks are, however, omitted from the initial and department lock plates, as shown in Figs. 14 and 13. The downwardly extending stem portions 23ª, 24ª and 25ª of the value, initial and department lock plates normally terminate a short distance above the longer bar of a yoke 28, the end portions of which are fulcrumed on a transverse frame rod 29. Through the action of a spring 30 the yoke 28 is normally depressed, said yoke being provided with a depending lug 31 which contacts with the upper side of the base plate 1, and holds the yoke in proper position.

35 represent latch plates, the lower end portions of which are fulcrumed on the horizontal frame rod 29, there being one of these latch plates for each of the lock plates 23, 24 and 25. The latch plates, as shown, are formed with curved or convexed outer edge portions normally overlapping the hook recesses of the lock plates. Each of the latch plates has its upper end portion provided with a recess 36 which is formed, as indicated respectively at 37 and 38, with upper and lower rear and forward offsets or pin seats. In the upper and rear seat or offset 37 of each of the latch plates normally rests a laterally projecting pin 39 of the adjoining lock plate, the engagement of said pins and offsets serving to normally retain the hook fingers of the lock plates in such positions that an inward movement of one of the keys of a corresponding set will result in the pin 19 of said key coming into contact with the inclined face of one of said hooks. The lock plates are normally pressed downward and the latch plates forward through the medium of springs 40 which have their central portions wound about the laterally projecting pins 41 on the latch plates and have their ends bearing respectively against the rear sides of latch plate pins 42 and upper side of lock plate pins 43.

As indicated in Fig. 13 of the drawing, the department latch plate 35 is provided in its lower portion with a rearwardly projecting arm 35ª which, through mechanism hereinafter described, releases the drawer or the operating lever. On the shaft 8, I fulcrum a lever 44 (see Fig. 14) the upwardly extending arm or portion of which loosely engages a pin 45 which projects from the forward portion of the initial latch plate 35. The lower or downwardly extending arm of the lever 44 engages a laterally projecting pin 46 of the upwardly extending arm 47 of a horizontal lug frame 48, the latter consisting of a bar provided at intervals with upwardly projecting lugs or arms 49 from which project lateral tubular bodies 49ª which are journaled on the shaft 29 (see Fig. 13). Each of the tubular bodies 49ª is provided on its rear side with a projecting lug 50. It may here be stated that when an initial key is depressed its latch plate 35

(see Fig. 14) is rocked rearwardly, which turns the lever 44 and the lug frame 48 on their respective pivots so as to bring the lugs 50 in front of the depending stems 23ª of the lock plates 23 of the value keys. Thereafter, if it should be attempted to depress a value key the stem of its lock plate would be intercepted by the corresponding lug 50, thus making it impossible to depress the key far enough for it to become engaged by the hook 27, or far enough for it to release any other key in its bank that may have been previously depressed.

Upon a transverse rod 51 which is arranged beneath the shaft 26, I mount a set of swinging yokes 52, each of the latter comprising united long and short arms 53 and 54, these arms inclining forwardly from said shaft or rod as shown. Each of the longer arms 53 is provided at its outer and upper end with an enlarged head portion 53ª, the end of which presents an angular face as indicated at 53ᵇ, while each of the shorter arms 54 terminates in a downwardly extending hook portion 54ª. Of these yokes 52, there is one for the initial keys and one for each set or bank of the value keys, that belonging to the initial bank being shown to the extreme right in Fig. 16 of the drawing. The angular heads 53ª of the longer arms 53 of the yokes 52 engage, as indicated in Figs. 5 and 14 of the drawing, laterally projecting pins 55 of the latch plates 35. I also mount to swing on the shaft 51, as shown more clearly in said Fig. 16, a yoke frame 56, the latter being in the nature of a double yoke, one section of which has its horizontal bar 56ª projected forwardly and normally in contact with the rear sides of the longer arms 53 of the yokes 52 which belong to the value keys, this contact being maintained by a spring 57ª (see Fig. 5). The remaining portion or section of this double yoke has its horizontal bar 56ᵇ normally projected rearwardly from the shaft 51. Of this yoke portion 56ᵇ, 57 and 58 represent forwardly extending arms. Upon the shaft 51 within the yoke portion 56ᵇ, I journal the rear end or head of a forwardly extending bar 59 said head portion also being provided with a shorter laterally extending arm 60 which extends in the direction of the length of the shaft 51 and which normally contacts with the rear side of that yoke arm 53 which belongs to the initial bank of keys. With the outer end of the yoke arm 58 is pivotally connected an upwardly extending plate or blade 61, the latter having its forward curved side provided at intervals with radially arranged recesses 62. The upper end of the blade 61 is provided with an elongated slotted opening 63 through which the shaft 9 passes loosely. Rising from the outer end of the bar 59, with which it is pivotally connected, is a second forwardly bowed blade 64, which is adapted for use, as hereinafter described, in connection with the department key set and which is provided with radially arranged recesses 65 which correspond in number and substantially in arrangement with the keys of said department bank, the lower recess in this key case being adapted to be employed in connection with the no-sale in the manner hereinafter shown. The outer end of the yoke arm 57 has pivotally connected therewith the lower end of an upwardly extending bar 66, the upper end of the latter normally terminating at a point immediately below the lower recess 65 of the blade 64. This bar 66 is, near the center of its length, provided with a slotted opening 67 through which extends loosely the shaft 8. The blade 61 is normally so supported as to bring the recesses 62 thereof below or out of alinement with the pins 19 of the keys of the initial bank, while the corresponding recesses 65 of the blade 64, with the exception of the lower recess, are similarly located with reference to the pins 19 of the keys of the department bank.

Mounted to swing on the main shaft 26 are the forward end portions of the side arms of a curved yoke frame 68. One of the side arms of the curved yoke 68 is provided with an upwardly extending arm 69 the upper end or head of which, as indicated at 70, is in the form of an oblong cam frame, the central opening of which is in the nature of an elongated curved slot 71 having its rear end inclined. In constructing this cam frame head, the slotted opening 71 is bridged in its central portion and on its rear side by a back plate 72 from the central portion of which projects forwardly within the slotted opening 71 a curved rib or guide bar 73 (see Fig. 8). The back plate 72 is provided with a projecting pin 72ª.

In the enlarged or thickened upper side of the cam frame, I provide a vertical slotted opening 74 and, within the latter, I pivot near one end a pawl 75, the rear end of which is in contact with a short spring 76 projecting from a socket in the body of the frame and the forward end of which pawl is provided with a downwardly projecting tooth which normally extends within the upper portion of the slotted opening 71, this tooth or projection presenting on its rear side an inclined or curved surface, as shown. I also fulcrum on the main shaft 26 a set of frame yokes 77, these frame yokes being of different sizes and arranged one within the other, as shown more clearly in Fig. 7 of the drawing. Those fulcrumed side bars of the yokes 77 which are on the left of the center of the machine, are formed each with a forwardly projecting segment 78, the rim of each of the latter being in the arc of a circle which is eccentric to the shaft 26 and each of said rims being provided with successively arranged notches or stop shoulders 79. As indicated in the drawing, there is one of these segments for each row or set of value, initial and department keys and the lower end extension of each segment, with the exception of the department segment, is provided with a laterally projecting pin 80. Those side arms of the yoke frames 77 which are fulcrumed to the right of the center of the shaft 26 are provided with forwardly and thence laterally extending arms or extensions 77ª, these angular yoke extensions being employed for the purpose hereinafter set forth. The outer yoke 68 is normally pulled downward by a spring 81 (see Fig. 6) which connects said yoke with a forward frame plate 82. The outer gravity yoke 68 is provided in its rear portion with a downwardly extending bar or arm 83, the lower end of which is bent rearwardly and thence downwardly, as shown more clearly in Fig. 4, and the yokes 77 are adapted to bear upon the forwardly extending head 83ª of the arm 83, said yokes 77 being normally depressed by springs 84, the forward ends of which are mounted on the shaft 26 and the rear ends of which bear upon the upper sides of said yokes. (See Fig. 7.)

The lower end portion of the arm 83 of the yoke 68 is, as indicated in Fig. 11 of the drawing, adapted to extend through an opening 85 in a block 86 which is adapted to slide horizontally on the side shoulders of a slotted opening 87 in the base plate 1, this slotted opening extending from a point adjacent to the rear side of the plate 1 to a point in the forward portion thereof. Supported upon the plate 1, parallel with and adjacent to the slotted opening 87, is a rack bar 88; and, pivoted in a laterally projecting bracket of a vertical arm 86ª of the block 86, is a swinging dog 89, the latter adapted, when the block 86 is moved in its guideway, to successively contact with the teeth of the rack 88 and to engage said teeth and prevent the return of the block 86 until it has moved in the direction in which it is started and until said dog 89 is out of contact with the teeth of said rack bar. The block arm 86ª is provided on its upper portion and inner side with a friction roller 86ᵇ. The forward side of the block is provided with a forwardly projecting hook arm 86ᶜ. Journaled on the shaft 51 are the end portions of a yoke frame 90, this yoke frame being provided at one end with a forwardly projecting lug 91 and at its opposite end with a downwardly and thence rearwardly extending latch arm 92. The rear end portion of this arm 92 is again bent downwardly and provided with a lateral projection 92ª which is adapted to engage a lateral recess 93 of the block 86. The outer portion of the lower end of the arm 92 abuts against a projection 94 on the upper side of the rear end of the cash drawer 5. As was previously described, and as will be readily seen from Figs. 11 and 13, when any of the keys in the department key bank is depressed, the latch plate is moved rearwardly so that its arm 35ª bears upon the lug 91 of the yoke frame 90, which results in raising the latch arm 92 to release the drawer or the block 86. This rear end of the cash drawer is provided, as indicated more clearly in Fig. 12, with a vertical recess 95 and, adjacent to the latter on the outer side of the drawer, is provided a short horizontal keeper or bolt guide 96 through which is adapted to extend a bolt 97, the outer end of the latter being pivotally connected with a forwardly extending controlling bar 98. This controlling bar is also pivoted, as indicated at 99 in Fig. 6, at the center of its length to a drawer frame base. The lower end of the yoke arm 83 normally bears against the rear side and upper portion of the bolt 97 when the controlling bar 98 is so moved on its pivot as to project the bolt 97 across the recess 95. It is evident that when in this position the downward and forward swinging movement of the yoke 68 must result in forcing the drawer outward to its open position. In case, however, the bolt 97 is withdrawn from its position across the recess 95, as shown in Fig. 12 of the drawing, it is obvious that the yoke arm 83 may travel through the recess 95 and thereby move independent of the drawer. In case, however, the bolt is across the recess 95 and the yoke arm 83 is employed to force the drawer outward, it will be seen that the raising of the yoke arm 83, by means to be hereinafter described, will cause the drawer to be closed through the engagement of the hook arm 86ᶜ with the bolt 97. The shaft 51 has rigidly connected therewith a frame piece 100, with the rearwardly projecting portion of which is pivotally connected the forward portion of a trip lever 101, the rear portion of this trip lever curving upwardly, as shown, and terminating in a flattened extension 102. This flattened termination 102 is continued forwardly as a flange 103 which projects laterally, as shown more clearly in dotted lines in Fig. 4 of the drawing, from the trip lever 101. This flange 103, as shown in said dotted lines, inclines from said end portion 102 thence extends forwardly and ends in a second incline. The forwardly extending portion of the trip lever 101 projects beneath the yoke 28.

From this description it will be understood that when the block 86 is moved rearwardly the roller 86ᵇ will pass over the flange 103, thereby depressing the rear end and raising the forward end of the lever 101, and also raising the yoke 28. By reference to Figs. 5 and 13 it will be seen that this yoke extends across and below the depending stems of the lock plates for the keys, and that when it is raised in the manner stated the said lock plates will be lifted, which will result in releasing all the depressed keys.

Upon the shaft 8 is mounted to swing an elongated frame 104, this frame or swinging bar having formed on one end an upwardly extending arm 105, said arm being provided with a slotted termination, as shown more clearly in Fig. 13 of the drawing. Through the slot of this arm 105 extends loosely the pin 19 of the stem of the no-sale key 18. The opposite end portion of the frame 104 is bent to a substantially yoke form, as indicated at 104ᵃ, and this portion of said frame terminates in a short rearwardly extending arm 106 with which is pivotally connected the lower end of an upwardly extending bar 107. This bar 107 has its upper end pivotally connected at 108 with a rearwardly bent lug 109 of a shutter and stop plate 110, this shutter and stop plate normally closing a correspondingly shaped opening 111 of a horizontal spring plate 112, with which the ends of said shutter are pivotally connected. The lower portion of said spring plate is affixed to a frame shaft 113 (see Figs. 1 and 6). The shutter 110 is, as indicated more clearly in Fig. 31 of the drawing, provided on its upper side with inwardly or rearwardly projecting separated lugs 110ᵃ said lugs being adapted to coöperate with projections on the register wheels when it is desired to set the register to zero. As indicated more clearly in Fig. 26 of the drawing, I form the portion 104ᵃ of the rocking frame 104 with a forwardly projecting tongue 114. This tongue is adapted to enter a slotted opening 115 in the lower end portion of the downwardly extending bolt 116 of a suitable lock 117, said lock being secured on the inner side of the lid or door 118 of the casing of the machine. This casing, a portion of which is indicated at 119 in Fig. 6 of the drawing, is adapted to cover the registering mechanism and is made of any suitable outline or design.

In connection with the lock 117, I provide a suitable form of automatic counting mechanism which is inclosed in a casing 120, said casing being provided with openings 121 through which the counter numerals are displayed. This combined lock and recording or counting mechanism is of that well known character in which the operation of the locking bolt 116 results in an additional numeral being recorded by the counting mechanism.

It will be seen that it will be impossible to unlock the lid 118 to gain access to the register until after the no-sale key has been depressed; and, if it were possible to raise the lid, the register could not be inspected without the operation of the no-sale key, as the register would be concealed by the stop-plate 110. The importance of these features of construction will hereinafter be made to appear.

Supported on the ends of the shafts 8 and 9 to the left of the machine are the upper and lower portions of a curved frame piece 123, the latter adjoining the end of the key frame. Within this frame piece 123, I provide mechanical counters 124, the latter having openings for the display of numerals therethrough, these openings registering with openings 125 in the face of the curved frame piece 123. With the central operating shaft 126 of each of the counters 124 is connected, on the inner side of the frame 123, a bifurcated arm 127 (see Fig. 24). Within the bifurcations of these arms project the laterally extending pins 19 of the department key stems.

As indicated in Figs. 10 and 5, I mount upon the shaft 9 a swinging frame 128, this frame being provided with two downwardly extending arms 129 and 130 which project respectively in the paths of laterally projecting pins 131 of the initial and department latch plates 35. The frame 128 is also provided with a rearwardly projecting arm 132 which, in its outer portion, is provided with a lateral shoulder 133. I also mount on the shaft 9 the inner end of a hook or catch bar 134, the outer end of the latter being provided with a hook termination 134ᵃ and the upper side of said catch bar having formed therewith a laterally projecting angular finger 135.

Extending transversely through the upper portion of the frame and connecting the standards 6 and 7 is a target or indicator shaft 137 on which is journaled the rotating targets or indicator disks which are intended to display the amount of a purchase, the initial of a salesman and the character of the sale. At the left and mounted upon said shaft 137 is an indicator or target disk 138, on which is printed at proper intervals words or abbreviations of words corresponding with those on the keys of the department set. On the right of this department target or disk is an initial target 139, on the periphery of which is printed at intervals letters corresponding with those on the initial bank of keys, also the dollar sign. On the next three succeeding targets to the right are printed the numerals naught to nine inclusive, these being the value targets and indicated at 140. On the central portion of the shaft 137, I journal a target of double width, such as indicated at 141, the latter having two parallel rows of numerals thereon from naught to nine, and these numerals standing in such relative positions as to admit of one row thereof being read properly from the rear side of the machine and the remaining row from the front side of the machine. To the right of this double target 141, I mount on said shaft 137 successively arranged targets 142 which are numbered from naught to nine inclusive and which are adapted to be read from the rear side of the machine. I also provide at the right of these value targets 142, initial and department targets 143 and 144, the printed matter on which is adapted to be read from the rear. On the central portion of the end of each of the cylindrical or disk like targets, I secure a laterally projecting pinion wheel 145 and, on the outer end of each of these pinion wheels, is secured a notched disk or star wheel 146. With these star wheels are adapted to engage the ends of pawl arms 147 of a pawl plate 147ª, which is secured to a transverse shaft 148 that is journaled in the framework in front of the targets. With the shaft 148 is connected the upper end of a bar 149 which, extending downwardly, has its laterally projecting pin 150 normally engaging the hook of the hook bar 134 (see Fig. 4). Gearing with each of the pinions 145 are the teeth of a gear segment 151, the latter being provided with a rearwardly and downwardly extending stem or arm 152 which is fulcrumed on a transverse shaft 153. This gear segment arm terminates in a rearwardly extended portion 152ª. The gear segment arms 152 of the two department targets 138 and 144 are connected through the medium of a connecting strap 154, and the initial targets 143 and 139 are connected by a similar strap 155. (See Fig. 1.) In a like manner the value targets are connected by straps 156. The central or double target 141 has its pinion 145 operated by direct engagement with one of the gear segments 151. The rear extensions 152ª, of those gear segment arms or stems 152 which operate the six targets to the left, are pivotally connected with downwardly extending and forwardly inclined bars 157, the lower ends of which are provided with angular slots 158 through which project pins 159 which extend from the yokes 77. As indicated at 157ª, I provide a spring which connects the gear segment arms 152 and bars 157, the arms of said spring respectively depressing the arms 152 and forcing forward the bars 157. Upon the shaft 26, I mount a frame 160, which consists of a horizontal bar which extends over said shaft and, parallel therewith and as indicated in Figs. 15 and 21 of the drawing, further consists in downwardly extending parallel arms 161, there being one of these arms for each of the segments 78 and each of said arms being provided with a journal projection 162 through which the shaft 26 passes. Each of the frame arms 161 is formed with a rearwardly projecting cam lug 163. One end of the frame bar 160 is, as indicated in Fig. 15, united with the arm 69 of the gravity yoke 68.

Rotatably mounted upon the shaft 26 at the right of the key board are value or amount registering wheels, there being in the present case six of these wheels shown, and each of said wheels, with the exception of the one to the extreme left, has its periphery provided with sets of numbers arranged one after the other, each set comprising the numerals from naught to nine inclusive. Counting from the right to the left these registering wheels are numbered for the sake of reference, respectively 164, 165, 166, 167, 168 and 169. The wheel 164 indicates cents from naught to nine inclusive; the wheel 165 indicates dimes from naught to nine; the wheel 166 indicates dollars; the wheel 167 tens of dollars; the wheel 168 hundreds of dollars and the wheel 169 thousands of dollars, the latter wheel having its periphery numbered continuously from naught to ninety-nine inclusive. In constructing each of the registering wheels, it is provided on one side with a toothed flange 170, there being one of these teeth for each numeral on the teeth of the wheel. Between the numerals naught and nine, I provide outwardly projecting lips 171 on the wheels 164 to 168 inclusive, and on the wheel 169 one of these lips is provided between naught and ninety-nine. Each of the registering wheels is also provided on its inner side opposite the lips 171 with inwardly projecting shoulders 172. Embracing the forward side of the registering wheels is the front horizontal bar 173 of a yoke 174, the side arms of which swing on the shaft 26. As indicated more clearly in Fig. 18 of the drawing, the yoke bar 173 is provided at intervals on its underside with springs 175, which are arranged to project from sockets in said yoke bar and against the end of forwardly projecting fingers 176 of curved catch bars 177, these catch bars extending between the registering wheels and having their laterally turned upper ends in position to engage the inwardly projecting shoulders 172 of said registering wheels. The yoke 174 is normally elevated and its bar 173 held in contact with the transverse shaft 113 through the medium of a spring 178.

Mounted to swing on the main shaft 26 are the inner ends of pawl carrying arms 179, the outer end portion of each of these arms being enlarged or increased in height and being provided at its outer end and at a point at the inner end of its enlargement with oppositely located laterally projecting guide flanges 180 and 181. The upper side of each of the pawl arms 179 in its outer and enlarged portion is formed with an upwardly extending and rearwardly projecting hook finger 182. Of these pawl arms there is one for each of the registering wheels with the exception of the wheels 168 and 169, said pawl arms extending between said registering wheels. Each of the pawl arms 179 is provided in its outer enlarged portion with a downwardly extending curved finger 183. Extending loosely through oppositely located openings in the flanges 180 and 181 of each of the pawl arms is a bolt or plunger 184, the inner end of this bolt or plunger being, as indicated more clearly in Fig. 6 of the drawing, beveled or pointed and adapted to engage the teeth of the corresponding registering wheel. Suitably journaled above the enlarged portions of the pawl arms is a transverse shaft 185 and in front of this shaft is suitably mounted a rod 186. The rod 186 extends loosely through elongated openings 187 in the ends of the side arms of a yoke 188, these side arms being provided adjacent to the outer portion of the yoke, with elongated openings 189 through which said journaled rod or shaft 185, passes. The longer bar of the yoke which extends on the outer side of the shaft 185 is formed with downwardly extending and parallel curved fingers 190, and the upper sides of the side arms of the yoke 188 are provided with upwardly and inwardly projecting angular brackets 191, these brackets being connected with the shaft 185 through the medium of pins 192 which extend upwardly from said shaft and project loosely through the inturned portions of said brackets. Rigidly connected with the shaft 185 is an upwardly extending arm 193, to the outer end of which is pivoted the rear end of a forwardly extending bar 194, the forward end of which, is pivoted, as indicated more clearly in Fig. 4 of the drawing at 195, to the lower end of an arm 196 which extending upward is connected with the pawl carrying shaft 148. As shown in Fig. 22 of the drawing, each of the plungers 184 has formed on its inner side, or that face which adjoins the side of the pawl arm, a recess 197 through which passes loosely the corresponding finger 190 of the yoke 188. From this description it will be understood that when the shaft 148 is rocked, in a manner hereinafter described, the rock shaft 185 will be correspondingly rocked; and as this occurs the pins 192 will move the yoke 188 backwardly and forwardly, the same being guided by the shafts 185 and 186. The fingers 183 are bent concentrically with the shaft 26, and as the pawl carrying arms 179 are moved up and down the bolts or plungers 184 are held in or out of engagement with their respective registering wheels.

Connecting the rear portions of the standard frames above the pawl hook fingers 182 is a fixed shaft or rod 198 (see Figs. 6 and 4) which, adjacent to one of the frame standards, has journaled thereon the rear end bar or head piece 199 of a rocking frame 200, this frame having its remaining end journaled on said shaft and being formed with a downwardly extending hook plate 201, the inturned hook or lip 202 of which is adapted to engage the hook fingers 182 of the pawl arms. With the head piece 199 is pivotally connected the rear end of a forwardly and downwardly extending bar 203, the forward end of the latter having a pivotal connection at 204 (see Fig. 23) with the outer side of a curved blade or plate 205, one end of which is pivoted on the shaft 9, the curved forward edge of this blade or plate thus lying in position to contact with the pins 19 of the charge, paid out and no-sale key stems. From the structure thus described it follows that when either of these keys is depressed the lip 202 will move forwardly so as to engage the hooks 182 and thus prevent the descent of pawl arms 179. It will thus be seen that the register mechanism is not operated when the charge, paid out or no-sale key is depressed.

Suitably journaled in the framework of the machine, above the registering wheels and arranged in the arc of a circle parallel with the arcs described by said registering wheels (see Fig. 6) are transverse shafts or rods 206. From each of these shafts projects a pin 207, these pins being arranged out of alinement with each other one above each of the five registering wheels. Each of the rods 206 adjacent to its outer end has projecting downwardly therefrom a short depending trigger 206$^a$, (see Figs. 30 and 6) the rear and lower side of each of these triggers being beveled, as shown.

208 represents angular bars, the lower ends of the substantially vertical arms of which are fulcrumed on the main shaft 26 one of said lever arms being thus fulcrumed between each pair of the registering wheels. The rearwardly extending arm 208$^a$ of each of these angular bars has its end portion provided with a laterally projecting lip having an opening therein which receives one of the pins 207. To the upper portion of each of the vertical arms 208$^b$ of the levers 208 is fulcrumed the lower portion of a catch lever 209, the latter being provided opposite its fulcrum point with a forwardly projecting pawl finger 209$^a$, which is provided near its outer end with a downwardly projecting tooth 209$^b$, and said catch lever is also provided in its upper portion with a short forwardly projecting arm 210. To each of the rearwardly extending arms 208$^a$ is pivoted, as indicated at 211, a forwardly extending hook bar 212, the hook shaped forward end of which is provided on its inner side with an angular recess or notch 213 which is adapted to engage the correspondingly shaped top and forward face of the head of the catch lever 209. The above described engagement of the hook bar and catch lever head is normally retained through the medium of a coiled spring 214 which connects said hook and the lower portion of the catch lever body. It will be observed that the engagement last described also serves to hold the pawl arm or finger 209ª out of the path of the teeth of the adjoining registering wheel. In rear of its pivot point the hook bar 212 is provided with a laterally projecting pin 215, with the upper side of which contacts the rearwardly inclined lateral shoulder of a pawl bar 216, the latter being fulcrumed centrally upon a transverse frame rod 217. In Fig. 17 of the drawing, I have shown portions of two adjoining registering wheels, and we will assume that the portion nearest the eye is the dimes wheel 165 and the remaining wheel portion the cents wheel 164. While the pawl arm or finger 209ª is normally supported above the teeth of the dimes wheel, it will be observed that the pawl arm 216 has its forward and inclined portion retained in the path of the projecting lips 171 of the adjoining cents wheel. In order to normally retain the upper arm 208ª of the lever 208 and hook bar 212 in their rearmost positions, I employ a coiled spring 218 (see Fig. 30) for the outer end of each of the rods 206. One end of each of these springs is connected with the stationary framework of the machine and the remaining end portion thereof is connected with and coiled about the end of one of said rods, the tendency of said spring being to turn the rods rearwardly.

As shown more clearly in Figs. 28 and 32 of the drawing, the forward end of one of the side arms of the gravity yoke 68 is formed with an upwardly extending arm 219, from the upper end portion of which projects forwardly a hook finger 220. Pivoted between laterally projecting lugs on the lower portion of the arm 219, is the lower end of a trip bar 221, the latter having its laterally projecting head 222 beveled on its forward and upper faces, as shown. The upper portion of this trip bar is limited in its outer swinging movement by a pin 223. The trip bar is normally pressed outward by a spring 224 which is contained in a hollow projection 225 on the face of said trip bar and the inner end of which bears against the arm 219. The spring actuated and normally outwardly pressed trip bar thus provided has its outer and beveled end portion retained in position to successively contact with the triggers 206ª when the gravity yoke bar swings downward and rearward. Upon the rod 9 which extends in front of the upper portion of the registering wheels are spring actuated dogs 226 (see Fig. 25). These dogs are respectively retained in engagement with the teeth of the registering wheels. I also journal on the shaft 9 a frame 228, the latter comprising a horizontal bar 228ª which, at one end, is formed with a rearwardly projecting frame like portion 228ᵇ (see Figs. 29 and 17). This frame portion 228ᵇ projects, as indicated more clearly in Fig. 6 of the drawing, between the pawl fingers 210 and 209ª of the transfer mechanism catch piece 209. As shown more clearly in Fig. 29 of the drawing, the outer end of the frame bar 228 has formed therewith a rearwardly extending arm 230 which is formed with a downwardly projecting shoulder 230ª and an upper finger extension 230ᵇ, the latter normally bearing on the frame rod 217. From the outer side of the arm 230 projects a pin 230ᶜ, and above and at one side thereof projects a lug 230ᵈ. 227 represents a latch bar the upper end of which is pivoted on the shaft 148 and the lower shouldered end of which is adapted to engage the rear side of the pin 230ᶜ as shown in Fig. 28. The latch bar 227 has extending downwardly from its head or upper end portion and on its forward side a spring strip 227ª which is adapted to engage the forward side of the lug 230ᵈ and thus hold the bar 227 into engagement with the pin 230ᶜ.

Connected with one side of the outer or gravity yoke 68 is an operating lever which normally projects forward and upward as indicated in Fig. 2 of the drawing, this lever being indicated at 231. Pivoted to the lower portion of the frame standard 7 is the forward portion of a catch plate 232, this catch plate having its forward or head portion recessed on its upper side to result in the production of a normally vertical finger 233 and an upper side hook finger 234 of less height than the finger 233, while the lower and rear end of the latch plate is enlarged to impart weight thereto and insure its normal contact with the top of the base plate 1.

Mounted on the base plate 1 of the register adjacent to one end of the machine, is the base plate 270 of a check and tape printer frame, of which 271 represents the inner vertical standard, which is provided in its forward and rear portion with upwardly extending bearing arms 272 and 273, and of which 274 is the outer frame standard which is extended upward opposite the inner frame standard arm 273. The check printer frame consists primarily in an inner frame plate 275 and an outer frame plate 276 which is parallel therewith, these frame plates terminating in their rear portions with disk like enlargements 275ª and 276ª. Journaled in the head portions of the frame plates 275 and 276 is a transverse shaft 277. On this shaft 277 is carried between said frame plate heads (see Fig. 40) a printing and feeding roll 278, said roll having formed on its periphery suitable type projections which may indicate suitable words such as "Amount purchased" "Please pay cashier". At the ends of the type covered portion of the periphery of the roll 278 are feeding flanges 279 and on the outer side of the inner flange 279 I mount on said shaft 277 a gear wheel 280. The shaft 277 is provided with an extension on the outer side of the frame plate 275, on the extremity of which is loosely mounted a pinion wheel 281. This extension of the shaft 277 is formed with a notch 282 with which is adapted to engage a spring actuated pawl 283 one end of which is eccentrically connected with the inner face of the pinion 281 (see Fig. 41). Loosely mounted on the shaft 284, which extends between the side frame heads of the check printer in rear of and below the shaft 277, is a printing and feed roll 285, this roll carrying, as indicated more clearly in Fig. 49 of the drawing, a printing collar 286, the latter having type projections on its periphery, these type projections indicating the name and address of a person or firm. At the sides of the printing collar 286, the roll 285 is provided with knurled flanges 287. The shaft 284 has that portion thereof on which the roll body 285 is mounted provided with a lateral enlargement such as is indicated at 288, and the inner end of said roll is formed with an eccentrically located recess 289 (see Figs. 49 and 51). Loose on the shaft 288 is a gear wheel 290, from which projects eccentrically a pin 291, the latter extending within said roll recess 289. The outer end of the shaft 284 carries an operating crank 292, the outwardly projecting outer end of which contains a spring actuated plunger 293 which is adapted to enter a socket 294 in the outer frame plate 276ª and, when in such engagement, prevent rotation of the shaft 284. The wheel 290 gears with the wheel 280. Journaled in front and above the center of the roll 278 is an inking roll 295, this inking roll being formed of suitable absorbent material and having its periphery in frictional contact with the faces of the type on the roll 278.

296 also represents an inking roll which is journaled above and in rear of the center of the roll 285 the periphery of which is in contact with the type faces on said printing roll. Journaled in rear of the roll 278 is a platen roll 297 which is adapted to press a strip of paper in contact with the type on the roll 278.

298 represents a journaled platen roll which performs a similar office for the printing roll 285.

299 represents a swing yoke, which is located between the side frame plates of the check printer at a point below and in front of the roll 278, said yoke having projecting from its upper portion, end trunnions 300 (see Figs. 38 and 52), these trunnions bearing in vertically slotted openings 301 (see Fig. 36) in the frame side plates 275ª and 276ª. Through the parallel arms of the yoke 299 passes a transverse shaft 302, said shaft being rigidly connected with the inner arm thereof. Mounted to turn on the shaft 302 in the inner portion of the yoke 299 (see Fig. 52) is a yoke 303. The inner arm of this latter yoke is provided, as indicated in Fig. 53, with a forwardly projecting finger 304. Journaled transversely in the inner or upper portion of the yoke 303 is a spring actuated pawl body 305, the latter being provided at intervals with downwardly projecting pawls or teeth 306 which gradually decrease in length from right to left.

Mounted on the shaft 302 are four printing wheels 307, these wheels having type figures projecting from their peripheries, the type figures on each wheel running from naught to nine, as shown in Fig. 55 of the drawing. At the inner end of the set of type wheels 307, and between the pairs of the latter, are mounted on the shaft 302 ratchet wheels 308 of less circumference than the wheels 307, each of said ratchet wheels being provided with a laterally projecting pin 309 through the medium of which it is secured to the adjoining type wheel. Each of these ratchet wheels has that tooth or notch which is opposite the type numeral 9 formed of greater depth than the remaining teeth or notches thereon, one of these deeper notches being shown at 310 in Fig. 53. Mounted on a rod or shaft 311, which is in rear of the pawl body 305, are depending pawls 312, the lower and hook ends of which are held in the path of the teeth of the ratchet wheels 308 through the medium of spring strips 308ª, said wheels being thereby prevented from reversal.

Mounted on the shaft 302 is a printing wheel 313, this printing wheel having transversely arranged on its periphery parallel rows of type projections indicating abbreviations of the names of the months of the year. This printing wheel 313 is formed with a short outward extension in the form of a ratchet wheel such as is indicated at 314. The printing wheel 313 is also provided with an outwardly extending central tubular extension or sleeve 315 through which the shaft 302 passes loosely. On the outer end of the tubular extension 315 is carried a head or finger disk 316 on the periphery of which is printed, stamped or otherwise made to appear the abbreviations of the months of the year. Mounted on the tubular extension of the wheel 313 adjacent to said wheel is a date printing wheel 317 on which are the type faces representing the numerals 1, 2, 3. This date wheel 317 is also provided with an outwardly extending tubular extension 318 which terminates in an operating head 319, the latter having on its periphery numbers corresponding with those on the wheel 317. Mounted on the sleeve or tubular extension 318 is an outer date printing wheel 320 on which appear the type numerals naught to nine inclusive. The wheel 320 is provided with a tubular extension or sleeve 321 which surrounds the sleeve 318 and which also terminates in a head 322, on the periphery of which appear the numerals corresponding with those on the wheels 320. Both the wheels 317 and 320 are formed with ratchet extensions 323 with the teeth of which and the teeth of the wheel ratchet 314 engage additional pawls 312. Connecting the upper sides of the check printer side plates is a bar 324, the latter being provided with a downwardly curved finger 325 which projects within the path of the finger 304 of the yoke frame 303. The outer dating wheel sleeve 321 bears in an upwardly and forwardly curved slotted opening 326 in the side frame plate 276 (see Fig. 37) and the inner end or extension of the shaft 302 passes through a similar slotted opening 327 in the side plate 275 (see Fig. 33).

In front of the numbering and dating wheels above described, I journal an inking roll 328. As indicated more clearly in Fig. 41 of the drawing, I secure to the yoke side bar 68 a downwardly extending and forwardly curved rack plate 329, the toothed rear and lower edge of which engages the teeth of the pinion 281. I also secure to the yoke side bar at a point above or on the inner side of the plate 329 a shorter rack or segment bar 330, the teeth of which mesh with those on the outer end of a segment 331 which is carried on one end of a transverse shaft 332 which is journaled in the check printer frame above the numbering and dating mechanism. The outer end of the shaft 332 is provided with an arm 333 from the lower end of which projects inwardly a pin 334, the latter extending loosely within a curved slotted opening 335 in the forward end portion of a bar 336. This bar 336 is pivoted at its rear end, as indicated at 337, to the check frame side plate head 276ª. The outer trunnion 300 of the yoke 299 also projects through the curved slotted opening of said bar 336. On the inner side of the lower and rear portion of the segment 331, I provide a projecting pin 338 which also projects within a curved slotted opening of a bar 339, which is shown in plan in Fig. 34, and which is partly shown in elevation in Fig. 33, this bar corresponding in construction with the bar 336. Mounted on the shaft 332 is a spring 340, the upper end of said spring engaging the forward side of a projecting pin 340ª on the segment 331, while the forwardly extending end portion of said spring bears against the outer side of the shaft 302 and retains the latter in contact with the curved upper side of the forwardly projecting foot portion of said segment. Between this segment foot and lower end of the spring projects the outer end portion of the shaft 302.

Below the numbering and dating mechanism hereinbefore described, I provide a paper guide plate 341, this guide plate being slightly bowed or curved, as shown, and having its forward portion provided with an upper side shearing plate 342, between which, and the body of the plate 341, is formed a paper passage. As indicated in Figs. 40 and 38, the shearing plate 342 has, rising from one side and adjacent to the inner end thereof, a lug 343 with which the finger 304 of the yoke 303 is adapted to engage. The guide plate 341 is provided centrally on its upper side with a transverse platen bar 344 which extends beneath the numbering and dating printing wheels.

345 represents a cutting frame, the rear bifurcated end of which is pivoted to opposite sides of the guide frame 341, as indicated at 346, the forwardly extending portion of which terminates in parallel arms 346ª.

346ᵇ indicates a spring strip one end of which is secured to the rear and underside of the guide body 341 and the forward and free end portion of which exerts a downward pressure upon the rear portion of the cutter frame 345. The extremities of the arms 346ª are provided with outwardly projecting pins 347 (see Fig. 38). As shown in Fig. 40 of the drawing, I secure to the vertical forward end of the body of the cutting frame 345 and between the inner ends of the arms 346ª, an upwardly projecting knife or cutting blade 348, the upper edge of which is beveled or sharpened as shown. Secured to the outer face of this knife blade is an upwardly projecting guide strip or plate 349 the upper portion of the latter being inclined or curved forwardly as shown.

350 represents an inking device which is in the form of an oblong box, as shown in Figs. 34, 40 and 50 of the drawing, which extends in front of the inking roll 328. This inking device or casing, in addition to containing ink, is provided in its forward portion with a transverse inking pad 351 of suitable absorbent material, the upper side of which projects through a slotted opening in the upper side of said casing. At each end, the ink case is formed with an upwardly projecting flange 352. (see Figs. 34 and 38) and from each of these flanges project outwardly an end pin 353, one of these end pins extending through a slotted opening 354 in the inner side plate 275, (see Fig. 33) and the remaining or outer pin projecting through a slotted opening 355 in the outer check printer side plate, as shown in Fig. 56 of the drawing. This slotted opening 355, as indicated in Fig. 56 of the drawing, is provided at its forward end with an upturned arm or offset 355ᵃ. Extending transversely across the inking case 350, at suitable separated points are inking pad dividing blades 356, these blades projecting forwardly and upwardly as indicated in Fig. 40. The outer end of the inking case is also provided with a pin 357 which also projects through the slotted opening 355 of the check frame side plate. this latter pin having a squared outer end portion. On the outer side of the outer frame plate 276, as indicated in Figs. 37 and 35, I provide a sliding plate 358, this plate having its upper portion provided with horizontal slotted openings 359 through which project loosely the head portions of shoulder screws 360. The plate 358 is also provided in its lower and forward portion with a forwardly projecting slotted arm 361 through which projects loosely the head of a shoulder screw 362. The lower and forward end of said plate is also provided with a downwardly extending and outwardly thickened arm 363. In the plate 358, I form a vertical slotted opening 364 which is adapted to register with the vertical arm 355ᵃ of the frame slot 355. Through this slotted opening 364 projects the squared end of the pin 357 of the inking device. Pivoted in rear of this pin 357 at its rear end is a short lifting lever 365, the forward notched end of which engages the outer end portion of the pin 357. In its forward end the lifting lever 365 is provided with a downwardly projecting extension 366 which is beveled or rounded, as shown, on its forward side. As indicated at 367, I recess the under and forward side of the plate 358, said recessed portion presenting a curved upper surface from a point on the forward side to a point in the rear of the bottom portion of the slotted projection 361. 368 represents a stop pawl which is pivoted in its forward portion at 369 and which, normally resting upon a laterally projecting pin 370, has its outer end portion projecting over the upper boundary of the recess 367. From the outer side of the check printer frame plate 276 I support a tape printer frame comprising inner and outer parallel side plates 371 and 372, these side plates being united in the manner hereinafter shown.

373 is a cam shaft which extends transversely through and is journaled in the forward portion of both the check and tape printing frames. On the inner end of the shaft 373, I mount loosely a pinion wheel 374 (see Fig. 41) and on that face of said pinion which is adjacent to the outer side of the inner check printer frame plate 275 is pivoted eccentrically a spring actuated pawl 375, this pawl bearing on the periphery of a cam collar 376 on said shaft and adapted to drop into engagement with a shoulder 377 of said cam ring. On the shaft 373 adjacent to the ring 376, I secure the inner end of an outwardly extending cam finger 378. (See Fig. 57.) On the outer side of the cam finger 378, I mount rigidly on said shaft 373 a cam sleeve 379 the latter being provided with a tangential projection 380 which extends in a direction parallel with the finger 378. On the outer side of the cam sleeve 379, I carry on the shaft 373 a cam finger 381 corresponding in form with the cam finger 378. The cam bodies 378, 379 and 381 are contained within the space between the inner sides of the check printer side plates. On the outer side of the outer plate 276 the shaft 373 carries an angular cam body 382, the arms of which are indicated respectively at 383 and 384 in Figs. 35 and 57. On the outer side of the angular cam 383, the shaft 373 carries a cam disk 385, the latter being eccentrically supported on said shaft and having formed with its outer side an outwardly projecting boss 386 from which projects a tooth 387. On the inner side of the tape printer frame, the shaft 373 carries a cam sleeve 388 which corresponds in form with the cam sleeve 379 and which, as prescribed for the latter, is provided with a tangential arm or projection 389. On the outer end of the shaft 373 is mounted a cam finger 390 which extends substantially at right angles with the direction of projection of the cam arm 389. The cam body 388 is within the tape printer frame and the projection 390 is on the outer side thereof. Pivoted on pins 391, which project inwardly from the upper portion of the check printer side plates 275 and 276, are the forward ends of parallel arms 392 of a platen yoke 393, the transverse rear bar of this yoke having mounted thereon a suitable platen pad 394. This platen yoke frame is normally pressed downward by springs 395. Connecting the yoke arms 392 is a transverse bar 396, the latter having secured thereon the rear portion of a spring plate 397, the inwardly and rearwardly extending portion of the platen yoke of which extends beneath the platen head or transverse portion 393, or is adapted to contact with the outer end of the cam projection 380 of the cam sleeve 379.

In the rear end portion of the tape printer frame and between the plates 371 and 372 is journaled a guide roller 398 and in front of this roller is adjustably supported an inking case and pad 399. Through the rearwardly extending arms 400 of this inking device, extends a transverse shaft 401 which projects from the plate 358. The body of this inking device is similar in construction to the inking device 350, being provided with an upwardly projecting inking pad 402. The transverse rod 401 passes loosely through a slotted opening 403 in the inner frame plate 371, and the outer end or side of the tape printer inking device is provided with a projecting pin 404 which extends loosely through an angular slotted opening 405 (see Fig. 39), in the outer tape printer frame plate 372. On the outer side of the frame plate 372 is fixed one end of a spring strip 406, the remaining end of the latter projecting through an opening 407 in said frame side and bearing against one of the arms 400 of the inking device 399. Journaled in the frame side plates of the tape printer is a transverse shaft 408 which, on the outer side of the inner frame plate, carries a star wheel 409 (see Fig. 45). The teeth or notches of this star wheel are adapted, as indicated, to be successively engaged when said wheel is rotated, by the hook shaped termination of a spring pawl 410, one end of which is connected with the tape printer frame, this pawl serving to prevent a backward rotation of said star wheel or an overthrow thereof. Mounted on the shaft 408 between the tape printer side plates, is a feed roller of rubber or similar material 411 (see Fig. 36). Above the end portions of this roller are journaled feed idlers 412, the peripheries of which are in frictional contact with the periphery of the roller 411. On the outer side of the outer frame plate 372, the shaft 408 is provided with a thumb nut or finger piece 413. Pivoted to the inner sides of the frame plates 371 and 372 are the forwardly extending parallel arms 414 of a swinging platen frame, upon the forward horizontal arm 415 of which is mounted a suitable platen pad 416. In front of the feed roll 411, I provide between the tape printer side plates a forwardly extending downwardly inclined plate 417. Extending outwardly from the rear standard 273 of the inner frame plate of the check printer is a fixed rod 418. On the inner end of this rod or shaft 418 is loosely mounted a paper reel section 419, (see Fig. 47) this inner section consisting of a short tubular body provided in its outer portion with a peripheral flange 420, the outer end of said tubular body being formed with a half circumferential recess 420ª, said recess receiving the projection of the correspondingly shaped inner end of an outwardly extending reel section 421 which is also mounted on the shaft 418 and which in its outer portion is formed with separated flanges 422 and 423. The outer end of the reel tube section 421 is, as prescribed for the section 419, provided with a half circumferential recess 424 which receives the projecting portions of the correspondingly shaped end of an outer reel section 425, the latter consisting of a tubular body which terminates in an end flange or disk 426. The outer portion of the shaft 418 is formed with a longitudinal recess 427 therein, as indicated in Fig. 48. Within this recess is secured one end of a spring strip 428 which, extending outwardly is provided with a shoulder bend 429 which normally engages the outer side of the reel section flange 426. Upon the reel body or section 421, I mount a roll of paper 430 (see Fig. 40) and upon the outer reel body or section 425 is carried a paper roll 431. (See Fig. 39).

432 represents a transverse shaft which has its inner end portion secured to and projecting outwardly from a forward extension of the check printer side plate 276 (see Figs. 34, 37 and 39). Upon the shaft 432, in its inner portion, is loosely mounted a disk 434, the latter being formed with a half tubular central projection 435. This disk 434 has formed on its outer side a lateral extension in the form of a ratchet wheel 436 and with the outer side of said ratchet wheel 436 is formed a friction disk 437.

438 represents a clutch shoe, the latter being in the nature of a bowed spring strip, the curved end portions of which are adapted to be held in frictional contact with the under side of the disk 437. This clutch spring strip or shoe is connected centrally with an arm 441 which is fulcrumed on the shaft 432.

444 represents a driving arm, the inner ring shaped end of which loosely embraces the cam body 385 of the shaft 373 and the outer end of which is pivoted to the upper end of the arm 441. (See Fig. 45.) Loosely mounted on the reel shaft 432 is a reel tube 445, the recessed inner end of which engages the half tubular projection 435 of the flange 434. This tubular body 445 carries an outer end flange 446 and, as prescribed for the shaft 418, the shaft 432 is provided with an outwardly extending spring 447, the shoulder termination of which is adapted to prevent the tube 445 from slipping off the shaft 432.

448 represents a pivoted pawl, the outer end of which engages the teeth of the ratchet 436 and prevents reversed rotation of the latter. Secured to the outer reel flange 446 and extending from the inner side thereof adjacent to and parallel with the tubular body 445 is a paper binding strip 449. Projecting from the upper portions of the standard 272 is a shaft or rod 450 (see Fig. 37). On the inner portion of this shaft are journaled the upper portion of angular printing segments 451 and on the outer portion of said shaft are journaled similarly formed printing segments 452. Of each of these groups of segments, the one to the right has formed on its lower end or printing surface type numerals running from naught to nine and representing values in cents. The next three segments to the left are similarly formed, the type numerals thereon representing respectively dimes, dollars and tens of dollars. The next segment to the left has formed thereon type initials corresponding with those on the initial keys of the register, while the printing segment to the extreme left has formed thereon type letter projections indicating abbreviations of the various departments, as indicated on the department keys. The segments of the inner group 451 have their forwardly extending upper arms 451ª of varying lengths, said arms being connected with the outer end of the extensions 77ª of the yokes 77, these yoke extensions also being graduated in length as shown. The forwardly extending and upper arms 452ª of the group of printing segments 452, with the exception of the arm of the cents segment, have their outer ends connected with the corresponding arm 451ª of the inner segments through the medium of U-bars 453 which extend downwardly and rearwardly.

In order to illustrate the operation of my improved cash register and explain the utility of the various parts which have been described, we will assume that the value, initial and department keys are in their outer positions and that the cash indicating counters or wheels are so turned as to display the naught signs from both front and rear. We will further assume that a cash sale has been made amounting to five cents and that the sale is made by operator or clerk "B." In order to properly register and indicate the amount, the initial of the operator and the character of the sale, the operator depresses in succession the five cent key, the initial key B and the cash key of the department set. On the depression of the five cent value key, the laterally projecting pin 19 of said key stem comes into contact with the inclined face of the corresponding hook finger or projection 27 of that lock plate 23 which belongs to the cents bank or set of keys. This contact results in a slight upward movement of said lock plate permitting the pin 19 to pass the lock plate hook and at the same time raising the lock plate pin 39 out of its seat in the recess offset 37 of the latch plate 35. The continued inward movement of the key stem results in its projecting pin 19 exerting such pressure on the curved forward surface of the corresponding latch plate 35 as to result in forcing the latter rearward and in the pin 39 dropping into engagement with the inner or lower end of the latch plate recess 38. In this continued inward movement of the key stem, the pin 19 thereof moves past the inclined head of the lock plate hook finger and said hook finger drops over and engages said pin, temporarily locking said key stem in a depressed position. The rearward depression of the latch plate above described results, through its engagement with the yoke arm 53, (see Figs. 5 and 16) in swinging said yoke 52 rearward, and the shorter arm 54 thereof becomes disengaged from the pin 80 of the segment 78 which belongs to the cents bank or set of keys. This operation will be seen more clearly by reference to Fig. 21 of the drawing, in which the yoke arms 54 are shown in engagement with the pins 80 of the cents and dimes segments. The rearward movement of the yoke 52 above described, also results, through contact of its longer arm 53, with the bar 56ª of the yoke 56 in rocking said latter yoke about its shaft 51 (see Fig. 16). In the downward swinging movement of the portion 56ᵇ of the yoke 56, it is obvious that the yoke arms 58 and 57 will be swung upward, resulting in an upward movement of the blade or plate 61 and the bar 66. This upward movement of the plate 61 results in bringing the recesses 62 thereof into positions for receiving the pins 19 of the initial keys when the latter are depressed, the position of said plate 61 having previous to this time been such as to prevent the depression of an initial key. The corresponding upward movement of the bar 66 also results in the upper end portion of said bar moving over the no-sale recess 65 of the plate 64, thereby providing a stop for the laterally projecting pin 19 of the no-sale key stem and preventing a depression of the latter after the depression of the value keys. The depression of the initial latch plate, resulting from the depression of one of the initial keys as above described, results in a rearward movement of that yoke arm 53 which belongs to the initial latch bar 35, and this movement of said yoke arm owing to its contact with the frame arm 60ₒ, results in raising the arm 59 and the plate or blade 64, the recesses 65 of the latter thus being brought opposite the laterally projecting pins 19 of the department key stems and permitting the depression of said department key stems.

In case of an error in depressing one of the value keys and discovery of such error before the depression of an initial key, it is obvious that the mistake may be rectified without imparting a registering operation to the machine by subjecting another value key in the same bank or set to a partial depression. Through this last mentioned movement of the key stem, the contact of its pin 19 with the hook finger of the corresponding lock plate results in raising said lock plate sufficiently to allow the pin of the formerly depressed key to escape, through the action of the key stem spring, to its outer position and, owing to the incomplete depression of the last key operated, it will also return to its normal position.

In the rearward movement of the initial latch plate 35 (see Fig. 14) the outward or forward swinging movement of the lower end of the lever 44, through its engagement with the arm 47 of the yoke 48, results in throwing the projecting teeth or lugs 50 (see Fig. 13) of the yoke frame 48 into such position and proximity to the lower ends of the value lock plates as to prevent a forward movement of the same. In this manner it will be seen that after the depression of an initial key the value keys cannot be depressed and those previously depressed cannot be released. Owing to the fact that the hook fingers of the initial lock plate are formed blunt or without the pointed terminations, it is obvious that after one initial key has been depressed, an attempted inward depression of another key in the same bank must result in the laterally projecting pin 19 thereof coming into contact with these blunt hook finger surfaces, thereby preventing an operation of a second initial key. It will be understood that prior to the depression of any initial key the blunt portions of the hooks are held above the line of movement of the pins 19 by the latch plate 35 of the initial bank.

In the rearward movement imparted to the upper portion of the initial latch plate 35 through the depression of the initial key, said latch plate, owing to its contact with the rear arm 129 of the frame 128, (see Figs. 5 and 10) swings said frame 128 on its shaft 9 and results in the arm 132 moving upward and contacting with and lifting the arm 135 of the hook bar 134 (see also Fig. 4). This lifting of the hook bar 134 results in its hook portion being disengaged from the pin 150 of the bar 149 which depends from the spring actuated pawl shaft 148. The bar 149 being thus released, it is free to swing upward through the action of the spring 148ª of the shaft 148, thus releasing the pawls 147 from engagement with the notched wheels 146, and allowing the target wheels through the action of the spring actuated segments 152, to be swung to points showing the zero indications on the fronts of the set of targets to the left and on the rear of the set of targets to the right. It is evident that when the cash key of the department set was depressed, the engagement of its stem pin 19 with the slotted arm 127 resulted in imparting a sufficient movement to the shaft 126 of the cash counter to cause the counter to indicate an additional unit. It is obvious that that counter which belongs to the no-sale key is operated by the depression of the latter in a like manner.

On the depression of a department key, the latch plate 35 of the department set (see Fig. 13) is, as hereinbefore described, moved rearwardly and downwardly by contact with the pin 19 of the department key stem, resulting, through pressure of the arm 35ª on the lug 91 (see Fig. 11) of the swinging frame bar 90, and in such upward swinging movement of the latter as to raise the latch arm 92 out of engagement with the sliding block 86 and the rear end of the drawer, thus releasing the drawer and, (assuming that the bolt 97, see Fig. 12, is not thrown across the recess 95,) permitting the drawer to be opened by hand if desired. The releasing of the engagement of the bar 92 and block 86 above described, results in the block 86 sliding forward in its plate channel, this forward motion being imparted by the downward swinging movement of the gravity bar and the connection of the arm 83 of the latter with said block 86. The dropping or downward swinging movement of the gravity yoke 68 results in releasing those yokes 77 from support, the segment pins 80 of which have been previously released as described through depression of keys in the sets belonging to such segments. In this manner, the released yokes 77 are permitted to descend and their segments 78 are permitted to swing upward until the notches or teeth 79 of the swinging segments engage the inner ends of the key stems which have been depressed, the degree of swinging movement thus permitted the yokes depending upon the key depressed. In the beginning of the downward swinging movement of the yoke 68 heretofore described, the yoke arm 69 is swung rearwardly, with the result that the cam projections 163 of the frame 160, which is connected with said arm 69, are moved out of engagement with the lower ends of the target segment operating bars 157. The lower ends of these spring actuated bars 157 now swing forwardly, under tension of the spring 157ª, until the pins 159 are in the outer extremities of the shorter arms of the slotted openings 158. Through this engagement of the shouldered ends of the bars 157 and the pins 159, and the downward movement of the released yokes 77, the bars 157 are pulled downward, with the result that, through the corresponding swinging movement of the segments 152, the targets which are geared with said segments are rotated to degrees corresponding with the degree of downward movement of the yokes 77 so as to display from the proper reading points the amounts and indications corresponding with the value, initial and department keys depressed. The motion thus imparted to the set of targets to the left is contributed to the corresponding targets to the right through the medium of the frame bars 154, 155 and 156.

In the raising of the hook finger 134 heretofore described and the disengagement of said hook finger with the pin 150 of the bar 149 heretofore described, it will be seen that the bar 149 will have swung upward and rearward until the pin 150 is in the rear end and upper side of the cam frame 70 (see Figs. 4 and 8). In the rearward swinging movement of the cam frame or head 70 before described, it will be seen that the pin 150 travels from the rear end of the slotted opening 71 over the central rib or projection 73 and past the depending tooth of the pawl 75, temporarily raising said pawl during this operation. In this manner the pin 150 is now locked in the forward and upper portion of the slotted opening 71 and the pawl 75 has again dropped to the position shown in Fig. 8.

In the downward movement of the gravity yoke 68, it will be seen that the operating lever 231 will be swung rearward. The partial rotary movement imparted to the shaft 148 (see Fig. 4) resulted, through the connection of said shaft with the arm 196 and bar 194, in imparting a rearward swinging movement to the arm 193 of the shaft 185. This movement of said shaft resulted also in the rearward movement of the frame 188, (see Fig. 22). In the rearward movement of this frame, it is obvious that its fingers 190, through their engagement with the lateral recesses 197 of the pawls 184, will serve to force said pawls outward until their inner ends are out of engagement with the teeth of the registering wheels. The pawl carrying arms 179 being normally supported on the yokes 77, it is obvious that those pawl carrying arms, which are supported on the yokes which have been dropped in the manner heretofore described, will descend with said yokes. In the present case the only value key depressed being the five cent key, the only pawl carrying arm to descend is that which belongs to the cents registering wheel. In the downward movement of the dropped pawl, the parts are so arranged that the yoke which supports the arm 179 of said pawl drops a sufficient distance only to carry the pawl over a number of teeth on its registering wheel corresponding with the value mark on the key depressed. In case either the charge, paid out or no-sale key of the department key sets is depressed, it is obvious that it is not desired to permit the pawl carrying arms to drop with the dropped yokes 77 and, in order to prevent the dropping of the pawl arms, I have provided the pivoted plate 205 (see Fig. 23), which is adapted to be depressed or moved rearward by engagement therewith of the laterally projecting pin 19 of either of the department keys above mentioned. The depression of this plate 205 results, through consequent movement of the bar 203 and its connection with the hook plate 201, in moving the hook termination of the latter into engagement with the hook projections 182 of the pawl arms. In this manner said pawl arms are latched in their raised positions until the said department keys are returned to their normal positions and the supporting yokes 77 have been raised in the manner hereinafter described. The operating lever 231 may now be pulled forward to the position indicated in Fig. 2 of the drawing. In the first part of this forward movement of the operating lever and in the consequent first forward movement of the cam frame 69, it is obvious that the pin 150 of the bar 149 will move downward in the forward end of the frame 70 and, during the continued forward movement of said cam frame, said pin will travel beneath the rib 73. It is obvious that the head of the pawl 75 will prevent a return of the pin 150 through the channel which is above the rib or flange 73. In this movement of the bar 149, it will be seen that the target pawls 147 will be thrown into engagement with the teeth of the star wheels 146, thus holding the targets against rotation. Through the connection of the arm 196 and bar 194, and the connection of the latter with the arm 193 of the shaft 185, (see Figs. 22 and 4) the frame 188 is moved inward, with the result that the pawls 184 are forced inward until their inner ends are in engagement with the teeth of the registering wheels. In the forward movement of the operating lever and the consequent raising of the gravity yoke, it is obvious that the block 86 (see Fig. 11) will be moved rearward in its guideway and in such rearward movement the friction roller 86$^b$ of the block arm 86$^a$ travels over the inclined flange 103 of the trip bar 101, resulting in temporarily depressing the rear end portion of the latter and raising the forward end portion thereof, this forward portion engaging the underside of the yoke bar 28 (see Fig. 13) raising the latter and forcing the depressed lock plates 23, 24 and 25 to their upper or normal positions. In this manner the pins 39 of the lock plates are lifted out of the lower portions of the recesses 36 of the adjoining latch plates, and said latch plates together with the depressed keys, are allowed to resume their normal outer positions. By reference to Fig. 13 of the drawing, it will be observed that that portion of the lock plate resetting yoke 28 which is immediately beneath the department and initial lock plates is higher than the remaining portion of the yoke, thus insuring the return or resetting of the department and initial lock plates prior to the return or resetting of the value lock plates.

Any attempt of the operator of the machine to hold a department or initial key in a depressed position during the raising of the gravity yoke 68 will be defeated owing to the fact that, in the forward swinging movement of the cam frame head 70, its pin 72ª will, by contact with the downwardly projecting end portion of the finger 132 of the frame 128, result, through pressure of the arms 129 and 130 of said frame 128 against the latch plates of said key sets, in forcing the latch plates out and consequently forcing said keys outward.

In Figs. 9 and 10 I have shown in detail the mechanism whereby the depression of an initial or department key may be prevented during the raising of the gravity yoke and the consequent forward movement of the operating lever and whereby the holding of an initial or department key in a depressed position is prevented and the return of said initial and department keys to their normal positions is assured. On the depression of the initial key and the consequent inward movement of the initial latch plate 35, the pin 131 of said initial latch plate contacts with the arm 129 of the frame 128, resulting in lifting the arm 132 of said frame until the inclined outer end portion of said arm is in position to contact with the pin 72ª of the cam 70. The rearward movement of the cam 70, which follows the depression of the initial key, results in said pin 72ª passing under the beveled end of the arm 132 and in raising the latter to a still greater height, after which said arm drops downward until the arm 129 is again in engagement with the pin 131. During the operation of raising the gravity yoke 68 and the consequent forward movement of the cam arm 69 and operating lever, the depressed initial and department keys are released by the mechanism heretofore described, this release taking place when the pin 72ª is adjacent to the shoulder portion 133 of the raised arm 132 as indicated by dotted lines in Fig. 9 of the drawing. In case an attempt should be made to hold the initial or department key in a depressed position, it is obvious that the pin 72ª will contact with the shoulder portion 133 of the frame 128 and thus prevent the complete return of the operating lever and gravity yoke, or operate to force the key so held in depression outward. The depressed key, however, of the initial or department bank having been returned to its outer position, it is obvious that its arm 132 may drop downward to its normal position as shown in Fig. 9, thus permitting the pin 72ª to travel over the shoulder portion 133 of said arm and, during the passage of the pin over said shoulder, it is obvious that a depression of an initial or department key would be prevented, owing to the fact that said pin would prevent the upward movement of the arm 132. On the release of the depressed initial key, it will be seen that, through the forward movement of the initial latch arm 53 (see Fig. 16) and the consequent downward movement of the frame or lever arm 59, the plate 64 is again dropped downward until the pins 19 of the department keys are out of alinement with the recesses 65 of said plate 64, said department keys being thus locked against operation. On the release of the value keys, it is obvious that the forward movement of the catch arms 53 belonging to the value key sets will result in the frame bar 56ª swinging forward and in the arm 58 moving downward, thus drawing the plate 61 downward and thereby locking the initial keys against depression. This swinging movement of the frame 56, and the consequent downward swinging movement of its arm 57, also results in forcing downward the bar 66 until the lower or no-sale recess 65 of the plate 64 is uncovered and the no-sale key thus permitted to be depressed. As hereinbefore explained, the release of the value keys occurs immediately after the release of the initial and department keys and this former operation takes place while the pin 72ª is traveling over the shoulder 133 of the arm 132, the relative positions of the pin 72ª and shoulder 133 thus operating to prevent manipulation of the value or department keys through sudden movement of the latter or otherwise while the value keys are being returned and thereby preventing any possibility of displaying a false indication on the targets. It will also be seen that in the outward or forward movement of the block 86 (see Fig. 11) the pivoted dog 89 will travel or drag over the teeth of the bar 88 and, in case any attempt is made to raise the gravity yoke before it has completely dropped, it will be seen that the rear edge or base of said dog will engage the teeth of the rack bar, preventing such return until the dog has entirely cleared the rack bar. In this downward swinging movement the gravity yoke 68 comes into contact with the projection 233 of the trip plate 232, (see Fig. 2 of the drawing) resulting in tipping said plate 232 until its projection 234 is temporarily in the path of the gravity yoke 68. It is evident, however, that the return of the gravity yoke to its upper position, when said yoke is moved upward at a normal or reasonable speed, will permit the catch plate 232 to drop downward until its projection 234 is out of the path of said yoke; but, in case an effort is made to manipulate the machine or disarrange the parts by a sudden or sharp movement of the yoke toward the upper position, said yoke will engage the projection 234 before said projection has had the opportunity to clear the same, said projection serving to stop such undesirable rapid movement of the yoke. The employment of the rack bar 88 and pivoted pawl or dog 89 also results as will readily be seen in insuring the return of the operating lever and the gravity yoke to their normal positions when the operation of returning the same has been started.

In case it is desired to open and close the drawer automatically at each downward and upward movement of the gravity yoke and without the necessity of operating the operating lever, the lever bar 98 (see Fig. 12) is moved laterally to throw the bolt 97 across the recess 95 of the drawer. The bolt being in this position it is obvious that in the downward movement of the gravity yoke, the gravity yoke arm 83 will, by engagement with said bolt, result in forcing the drawer outward. It is evident that, when the drawer is returned to its closed position by hand, the gravity yoke and the parts supported thereby and connected therewith will be operated in the manner heretofore described, as the result of operating the operating lever. It will also be seen that the drawer may be closed by operation of the lever when the bolt 97 is thrown across the drawer recess 95, in as much as the hook arm 86ᶜ is in position to engage the forward side of the bolt 97 when the lever is operated and the block 86 is made to travel inward.

I will now proceed to describe the operation of the transfer mechanism whereby amounts are transmitted from one registering wheel to another. Assuming that the registering wheels were originally set so that the zero or naught characters thereon are displayed on the fronts of the registering wheels on a common plane, it is evident that the hereinbefore described operation of depressing the five cent key and manipulating the operating lever must have resulted in rotating the cents registering wheel of the cash group until the numeral five is displayed at the point above mentioned. Assuming now that the next sale to be registered also amounts to five cents, said five cent key is again depressed, the operating lever swinging rearward as before described. On the forward movement of the lever, the cents wheel is again rotated until an additional five cents is registered thereon, or until five numerals have passed the point of observation. This additional registration and movement of the cents wheel is such as to result in the display of the naught sign at the point of observation in place of the previously displayed numeral five, owing to the arrangement of the numerals on the peripheries in groups or series of ten each. In Fig. 17 of the drawing I have illustrated portions of two registering wheels, which for the sake of clearness in description, we have assumed represent cents and dimes wheels, the latter being represented by the wheel segment nearest the eye in said figure. The movement of the cents wheel heretofore described, causes an engagement of one of its peripheral contact lugs 171 with the end of that pawl arm 216 which is arranged above the cents wheel, the point of said pawl arm being raised by the passing of said wheel lug thereunder. The elevation thus imparted to the forward end of the pawl arm 216 results, through the downward pressure of the rear portion of said arm against the pin 215, in raising the hook end or head of the adjacent hook bar 212 out of engagement with the head of the pawl 209, allowing the lower tooth or arm 209ᵇ thereof to drop, by tension of the spring 214, into engagement with a tooth of the adjacent dimes wheel. When the operating lever is again released and allowed to swing rearward, it is obvious that the rearward swinging movement which is imparted to the spring pressed trip bar 221 (see Figs. 32 and 28) will cause the upper end of the latter to successively engage the depending triggers 206ᵃ of the shafts 206. It will be seen that the contact above described of the trip bar and depending triggers must impart partial rotations to the shafts 206. In the present instance, the partial rotation to which the first of these shafts is subjected and the consequent slight forward movement of the lever arm 208ᵃ is sufficient to cause the dimes registering wheel to be moved a distance of one tooth or number through the engagement of the pawl arm 209ᵃ therewith. In this manner the point of observation on the forward side of the cents wheel is made to display a cipher or naught sign, while the adjoining or opposite point on the dimes wheel will display the numeral 1, thus indicating that ten cents has been registered. In the forward movement of the lever 208, which is imparted by the tripping action or engagement of the lever 221 with the pins 206ᵃ, and the consequent forward movement of the pawl arm 209ᵃ of the dropped pawl 209, the outer end portion of the pawl arm 209ᵃ engages the underside of the frame bar 228, this engagement or wedging action of the pawl arm between the teeth of the dimes wheel and said bar, serving to insure the engagement of the pawl teeth 209ᵇ with the teeth of the registering wheel and operating thereby to prevent any return of the pawl carrying lever 208 to its normal position. The trip bar 221 having passed the last or outer pin 206ᵃ, and the upturned end of the finger 220 of the arm 219 coming into contact with the downwardly projecting portion (see Fig. 28) of the latch bar 227, results in moving said latch bar out of engagement with the pin 230ᶜ and, through the further engagement of said finger with the portion 230ᵃ of the arm 230, in raising the bar 228ᵃ away from the outer end of the pawl finger 209ᵃ, thus permitting the latter to be moved upward, and also results in raising the frame projection 228ᵇ of the frame 228 which, through its contact with the underside of the finger 210 of the dropped pawl 209, lifts said finger until the head of the lever 212 again engages the same, the pawl thus being again latched in an elevated position. The tension of the springs 218 of the shafts 206 act, when the pawl fingers 209ᵃ are released in the manner above described, to draw the lever 208, together with the parts connected therewith, rearward to their normal positions.

It is evident that although I have described only the method of transfer from the cents wheel to the dimes wheel, the different sets of transfer mechanism corresponding with that above described are operated in a corresponding manner to transfer from the dimes wheel to the dollars wheel, from the dollars to the tens of dollars, from the tens of dollars to hundreds of dollars and from the hundreds of dollars to thousands of dollars. It will be seen that in the upward movement of the gravity yoke and the consequent forward swinging movement of the arm 219, the contact of the depending pins 206ᵃ with the beveled head portion 222 of the spring trip bar 221 will result only in said trip bar moving outward at each contact with said pins.

Assuming now that a number of registering transactions such as hereinbefore described have taken place and it is desired by the proprietor of the machine to read the indications on the front of the registering wheels, it is obvious that it will become necessary, in order to complete the registration of the last transaction to operate those transfer pawls which, through the last transaction, have been dropped into engagement with the teeth of the registering wheels. In order to properly accomplish this, connections are employed with the bar 104 whereby access cannot be gained to the interior of the machine and the registrations read until the registering wheels have been moved to indicate the last transaction; and, in order to produce said last registration, it is first necessary to depress the no-sale key. The depression of this no-sale key (see Figs. 13 and 26) results, through the engagement of its pin 19 with the arm 105 of the yoke 104, in swinging said yoke inward until its projection 114 is drawn out of the lock bolt 116. This disengagement of the projection 114 and the lock bolt admits of the proprietor turning a key in the lock 117, thereby unlocking the lid or door 118 from the casing and admitting of said door being opened or raised. In the depression of said no-sale key and the consequent dropping of the gravity yoke 68, it will be seen that, in the manner heretofore described, those transfer pawls which have been previously dropped into engagement with the teeth of the registering wheels in carrying out a part of the last transaction, will be operated so that, when the lid or door is opened, the complete registrations will be indicated on the peripheries of the registering wheels opposite the opening 111. It will also be understood that the turning of the key in the lock and the connection of said locking mechanism with the counter 120 will result, as in the operation of the ordinary mechanical counters and locks, in displaying the additional numeral through one of the counter openings 121, said counter thus indicating the number of opening operations of the bar. In the inward swinging movement of the portion 104ᵃ of the yoke 104 above described, it will be seen that the bar 107 (see Fig. 13) will be drawn downward, with the result that the shutter 110 will turn on its pivots and uncover the opening 111, permitting the amounts indicated on the registering wheels opposite said opening to be read. It will thus be seen that means are provided in conjunction with the no-sale key whereby the registering wheels cannot be read until said no-sale key is depressed and until a proper registration of the last transaction has taken place. It now being desired to re-set the registering wheels to zero, the spring plate 112 (see Figs. 6 and 31) is pressed inward until the projecting teeth 110ᵃ of the shutter 110 are in the paths of the lips or projections 171 of the registering wheels. The yoke 173 is now moved downward, resulting, through the engagement of its spring actuated arms 177 with teeth 172 (see Fig. 18) of the registering wheels, in said registering wheels being turned until the cipher or naught signs are indicated through the opening 111.

I will now proceed to describe the operation of the check and tape printing mechanism and the manner of producing records on said checks and tape of the various transactions of the machine. In the downward swinging movement of the cents yoke 77 produced by the depression of the five cents key of the cents bank, it will be seen that the cents printing segments 451 and 452 will be swung downward and forward until the type numeral projections five of said segments are respectively over the platen head 394 and 416 of the check and tape printers. The depression of the initial and department keys produces, through the connection of the initial and department printing segments with the initial and department yokes 77, a similar downward and forward swinging movement of said initial and department printing segments, that type initial on the initial segment corresponding with the initial pin the initial key depressed and that type indication of the department corresponding with the indication on the department key depressed being thus supported immediately above said platens in said check and tape printers.

In order to start the paper strip 430 of the check printer into the check printing mechanism, the end of the tape is inserted between the printing wheel 278 and the roller 297. In order to feed the paper strip a proper distance through the check printing mechanism and print the preliminary matter thereon, such as the words "Amount purchased", date, and number, before depressing the value, initial and department keys above described, the no-sale key and the operating lever of the machine are operated the desired number of times to feed the paper strip between the rolls 278 and 297, between the former and the roll 285 and between the latter and the roll 298, thence beneath the dating and numbering printing wheels and through the forward portion of the guide plates 341 and 342. In this operation the descent of the gravity yoke 68 (see Fig. 41) and its gear segment 329, results in an idle returning of the pinions 281 and 374. In the upper movement of said gravity yoke and segment, however, rotary motion is imparted to the pinion 281 and its shaft 277, resulting in the rotation of the printing roll 278, the latter by contact of its type with the strip of paper 430 simultaneously feeding said paper strip downward and printing thereon the words "Amount purchased". In passing between the printing rolls 278 and 285, the flanges of said printing rolls continue the feeding action of the paper strip, while the contact with the rear side of said strip with the type faces on the roll 285 result in producing printed matter on the back of the strip. On the next downward movement of the gravity yoke 68 and its segment 329, the engagement of the toothed segments 330 and 331 result in the downward and forward movement of the latter which, through the engagement of its spring strip 340 and the end of the shaft 302, results in forcing said shaft and the numbering and dating printing mechanisms mounted thereon downward and rearward to the positions indicated in Figs. 33, 40 and 39, the end of the shaft 302 following the slotted opening 327 in the frame plate 275. In this manner the number and date printing wheels 307, 313, 317 and 320 are moved downward to such position as to bring the downwardly projecting type faces thereof immediately above the platen bar 344 (see Fig. 40). In the downward swinging movement above described of the segment 331, the arm 333 of its shaft 332 swings rearward and, upward and in the latter part of this movement, the pin 338 of the segment 331 and the pin 334 of the arm 333 exerts such downward pressure on the slotted bars 339 and 336 as to result in said bars forcing the outwardly projecting ends of the dating and numbering device downward to produce an imprint on the paper strip which is below the numbering and dating printing wheels.

Previous to the operation above described, the consecutive numbering wheels 307 (see Figs. 52, 53 and 55) are so set that the consecutive numbering wheel 307 to the right, has its type numeral one on the under or printing side of said wheel and the remaining numbering wheels to the left are so set as to bring their naught type projections on their under sides. The dating wheel 313 is, by rotation of the thumb nut 316, turned until the proper month is indicated by the type numerals on the underside of said wheel and in a similar manner, through turning of the thumb disks or nuts 319 and 322, the dating wheels 317 and 320 are set with the proper type numeral on their undersides. It will thus be seen that in the downward movement of the dating and numbering device above described, the units type wheel 307 will print the numeral 1 on the paper strip and the wheels 313, 317 and 320 will likewise print thereon the month and day of the month. The manner of turning the consecutive numbering wheels the distance of one type numeral at each operation and the manner of transferring from one wheel to the other is well known, but may be referred to briefly. At each upward swinging movement of the numbering and dating wheel frame 299, which is imparted in the manner heretofore described, the arm 304, by contact with the hook projection 325 (see Fig. 40) results, through the engagement of the pawl frame tooth 306 of the unit ratchet wheel 308 (see Figs. 52 and 54) in moving said unit wheel a distance of one tooth and, consequently, a distance of one type numeral thereon. The downward movement of the frame 299, which results in the contact of the arm 304 with the projection 343, operates to draw said pawl tooth backward and into engagement with the next succeeding tooth. After successively engaging the teeth of the ratchet of the units wheel, the pawl tooth 306 finally drops into engagement with the deeper tooth 310 thereof, thus permitting the next succeeding and slightly shorter tooth 306 to drop into engagement with a tooth of the ratchet wheel of the adjoining numbering wheel. In this manner the amounts are successively transferred in tens from one numbering wheel to another.

In the opening of my description of the operation of the check and tape printers, I have described the operation of dropping the proper printing segments 451 and 452 into printing positions. Again assuming that these keys have been operated and that the operating lever has been dropped rearward, a forward movement of said lever and a consequent upward movement of the gravity yoke 68 and the yokes 77 results as follows:—In the first part of the upward movement of the gravity yoke, the engagement of the teeth of the gravity yoke gear segment 329 with the teeth of the pinion 374 (see Fig. 41) and the engagement of the pawl 375 with the shoulder 377 of the shaft sleeve 376 causes a rotation of the shaft 373. In this rotation the contact of the projecting fingers of the cams 378 and 381 with the lateral pin projections 347 of the arms 346ᵃ of the knife lever 345 results in raising said knife carrying lever until its cutting blade 348 shears against the end of the guide plate 342 and severs the paper strip. During the last described operation, the cam projecting finger 383 comes into contact (see Fig. 35) with the downwardly projecting nose of the bar 365, resulting in lifting the latter and, through the engagement of said bar 365 with the end projection 357 of the inking pad box 350, said ink box is elevated, causing its pad 351 to ink the faces of the type on the printing segments which are immediately above the same. The continued movement of the cam projection 383 causes its contact immediately after the inking operation above described with the forward side of the enlargement 358ᵃ of the plate 358, this contact resulting in forcing said plate 358 rearward together with the inking box until the latter is in the position indicated in Fig. 40 of the drawing. The inking box being thus drawn rearward and out of the way, the cam projection 380 of the cam body 379 comes into contact with the spring strip 397 of the platen frame 392, causing the platen head 393 and its pad 394 to rise until the latter presses the paper into printing contact with the inked type projections of the operated printing segments 451. The cam projection 380 having passed out of contact with the spring 397, it is obvious that the latter, together with the platen frame, will drop to its normal position. It will thus be seen that the paper check, or that end of the paper which has been severed from the main body of the strip, may be removed from the check printer and it will be further seen that said check will have had printed on its face the words "Amount purchased," the consecutive number of the check, the date, the amount of the transaction, character of the transaction and initial of the operator. It will also be seen that the rear side of the check will have printed thereon such matter as may be indicated in type on the printing roller 285. The continued upward movement of the gravity yoke and the consequent continued rotation of the shaft 373 results in the cam finger 383 coming into contact with the downwardly extending arm 363 of the plate 358, thereby moving said plate and ink box forward to their normal positions. This continued upward movement of the gravity yoke and the corresponding upward movement of the yokes 77 results in lifting the previously operated printing segments to their normal positions and in lifting the numbering and dating mechanisms to its normal or elevated position, the latter operation being attained through contact with the foot projection of the inner end portion of the segment 331 with the end of the shaft 302, this contact resulting in lifting said shaft end in the slot 327.

Prior to the operation of the check printer above described, the strip from the paper roll 431 is, in the manner indicated in Fig. 36 by dotted lines, fed downward below the roll 398, thence forward over the platen head 415, over the feed roller 411 and beneath the friction rollers 412, thence over the plate 417 to the reel 445 with which the end of said strip is connected. Simultaneously with the upward movement of the inking box and pad of the check printer hereinbefore described, the cam arm 390 of the shaft 373, (see Fig. 39) by contact with the underside of the projection 404 of the tape printer ink pad frame, raised the latter until its pad was in contact with the lower type faces of the operated printing segments 452. On the passing of the cam finger 390 out of contact with the ink pad projection 404, the latter and the ink pad frame is permitted to drop and said ink pad is moved rearwardly, owing to its connection with the plate 358, which connection is effected by the rod 401. Simultaneously with the upward printing movement of the printing platen 394 of the check printer, a similar movement is imparted to the platen 415 of the tape printer, this platen tape printer being elevated to press the paper strip 431 into contact with the inked type faces on the lower sides of the operating printing segments 452 through the contact with said platen of the arm of the cam 389, this cam being shown in an operative position in Fig. 36 of the drawing. In this manner the tape has printed thereon the amount of the transaction, the initial of the operator and the character of the transaction.

In the first half of the upward movement of the gear segment 329, the pinion 374 has imparted thereto one half of a complete revolution, imparting thereby a corresponding rotation to the shaft 373 and the cam body 385, with the result that, during this first half revolution, the bar 444 is moving rearward and the friction shoe carrying arm 441 is swung forwardly. In the remaining upward movement of the gear segment and the corresponding remaining half revolution of the shaft 373 and its cam 385, said cam operates to move the bar 444 forwardly resulting, through engagement of the shoe 438 with the disk 437, in a rotation of the reel 445, this rotation of said reel being sufficient to wind a desirable portion of the paper strip on to said reel. In connection with this last described operation, it will be noted that as the paper strip is gradually coiled or wound on to the sleeve of the receiving reel 445, the circumference of the paper rolled thereon is gradually increased, with the result that the movement of said reel necessary to take up the slack in the paper gradually decreases. By the construction herein set forth, it is obvious that when the slack in the paper is taken up and said paper strip is thus drawn taut, the clutch shoe may slip on the periphery of the friction disk 437 without rotating the reel. It will thus be seen that simple, reliable and effective means are provided for compensating for the increase in the size of the roll on the reel. During the latter part of the rotary movement above described of the cam body 385, its tooth 387 comes into contact with one of the peripheral notches of the wheel 409 (see Fig. 45) thus rotating the feed roll 411 sufficiently to move the paper strip 431 forward a desirable distance, or such distance as to bring its printed portion a desirable distance in front of the printing point. In order to draw the printed tape forward to a greater distance for the purpose of reading the last transaction printed, it is obvious that this may be accomplished by turning the thumb piece 413, thereby rotating the feed roll 411.

It being desirable to discontinue the printing of checks and use the tape printer only, the spring actuated plunger 293 (see Fig. 49) is drawn out of engagement with the frame socket 294 and the crank arm 292 rotated until the cam portion 288 of the shaft 284 is in such position to hold the type faces and the peripheries of the flanges 287 of the roll 285 out of frictional contact with the roll 278. By thus throwing said printing roll 285 out of frictional engagement with the roll 278, it is obvious that the paper strip 430 will fail to feed through. It is obvious that in case it is not desired to print the tape, the paper strip 431 may be disengaged from the feeding mechanism of the tape printer.

Having now fully described my invention, what I claim and desire to secure by Letters Patent is,

1. In a cash register, the combination with a registering mechanism comprising numbered adding wheels, depressible keys and mechanism between certain of said keys and adding wheels for actuating the latter, of a cover or face plate for said adding wheels having an opening therein, a shutter adapted to close said opening and connections between said shutter and another of said keys whereby the depression of the latter results in moving the shutter to its open position.

2. In a cash register, the combination with a registering mechanism comprising rotatable registering wheels, depressible value and a no-sale key, and adding wheel operating mechanism interposed between said keys and adding wheels, of a movable shutter adapted to normally prevent the reading of the wheels and connections between said shutter and the no-sale key whereby the depression of the latter results in moving the shutter to disclose the peripheries of the adding wheels.

3. In a cash register, the combination with a registering mechanism comprising adding wheels, and depressible keys governing the operation of said registering mechanism, of a cabinet or case for said door, a movable shutter normally preventing the reading of the registering wheels and connections between one of said keys and said lock and said shutter whereby said lock cannot be operated or the shutter moved to disclose the registering wheels without a depression of said key.

4. In a cash register, a series of indicating and registering devices, value, initial and department keys adapted to determine the movement of the registering and indicating devices, a normally closed cash drawer and a catch therefor, in combination with a plate adapted to engage said catch and actuated by a department key.

5. In a cash register, the combination of an accounting mechanism, a series of value keys, a no-sale key, locking means to prevent the operation of the value keys after the no-sale key has been depressed, a shutter which normally conceals the accounting mechanism, and means operated by the no-sale key for moving the shutter.

6. In a registering machine, a register, an operating mechanism therefor, means for normally holding said mechanism against operation, a shutter normally concealing said register, and a no-sale key for moving said shutter and for releasing said mechanism.

7. In a registering machine, a register wheel, means for turning said wheel, value keys for controlling said means, a shutter for normally concealing said wheel, a special key for moving the shutter to expose the wheel, and means for locking the value keys when the special key is operated.

8. In a registering machine, a series of register wheels, a device for transferring from a wheel of lower to a wheel of higher order, operating mechanism for said transfer device, said mechanism being normally locked, a shutter normally concealing the register wheels, means whereby the said operating mechanism as it makes its initial movement causes the transfer to be made, and a special key for releasing the said operating mechanism and for moving the shutter to expose the register wheels.

9. In a registering machine, a series of registering wheels, means for adding amounts on said wheels and means for transferring from a wheel of lower to a wheel of higher order, a special key, a shutter for normally concealing the register wheels, a normally locked device for operating the transfer means, and mechanism for causing the depression of the special key to release the transfer operating device, to lock the adding means, and to move the shutter to expose the register wheels.

10. In a registering machine, a series of registering wheels, means for adding amounts on said wheels and means for transferring from a wheel of a lower to a wheel of a higher order, a no-sale key, a shutter for normally concealing the register wheels, a normally locked device for operating the transfer means, and mechanism for causing the depression of the no-sale key to release the transfer operating device, to lock the adding means and to move the shutter to expose the register wheels.

11. In a registering machine, a series of registering wheels, means for turning said wheels to add amounts thereon and means for transferring from a wheel of lower to a wheel of higher order, an operating device for both of said means, said device operating the transferring means during the first part of its movement and normally operating the adding means during the last part thereof, means for normally concealing the register wheels, a special key, and mechanism whereby the depression of said key causes the transfer to be effected, locks the means for turning the register wheels and moves the said concealing means from the register wheels.

12. In a registering machine, a series of registering wheels that are normally locked and concealed, means for transferring from a wheel of lower to a wheel of high order, and means for unlocking the registering wheels so that the transfer can be effected and for simultaneously disclosing the registering wheels so that the amount added thereon can be seen.

13. In a cash register, a bank of department keys, one of said keys representing no-sale transactions, an indicator controlled by the keys in said bank, a registering device, means for normally concealing said registering device, and mechanism controlled by the no-sale key for moving the said concealing means so that the register is exposed to view and for determining the movement of the indicator.

14. In a cash register, a series of register wheels, means for turning said wheels to add amounts thereon, means for transferring from a wheel of lower to a wheel of higher order, a cash drawer, means whereby the outward movement of the drawer effects the transfer and the inward movement thereof adds the desired amounts on the register wheels, a shutter normally concealing the register wheels, a no-sale key, and connections between the shutter and the no-sale key whereby the depression of the latter exposes the register wheels.

15. In a cash register, a registering device, mechanism for operating said registering device, means for normally concealing the registering device, locking means for holding the operating mechanism in its normal position, and a special key for releasing the operating mechanism and for moving the concealing means from the register so that it is exposed to view.

16. In a cash register, the combination with a casing, an operating mechanism, a register, the casing having an opening opposite the register, a shutter for normally concealing the register, a lid or door normally closing the opening in the casing, transfer devices, and devices for holding the concealing means and the door in operative position until the transfer is effected.

17. In a cash register, normally locked operating mechanism, a register, a casing having an opening opposite said register, transfer devices for said register that are operated by the operating mechanism, a door normally closing the opening in the casing, a shutter for normally concealing the register, and mechanism for holding the concealing means and the door in operative position until after the operating mechanism has been released to effect the transfer.

18. In a cash register, a registering device, a casing having a door or lid opposite said registering device, a shutter for normally concealing the registering device, a lock bolt for normally holding said door in its closed position, means for holding said lock bolt against movement, a key for releasing the lock bolt so that it may be moved to release the door, and connections between the key and the shutter for operating the latter.

19. In a cash register, a register operating mechanism, a registering device, a casing having an opening opposite said registering device, transfer devices for said registering devices, means for normally closing the opening in the casing, a shutter for normally concealing the registering device, a lock bolt for holding the door in its closed position, means for holding the lock bolt against movement, mechanism for releasing the register operating mechanism and the lock bolt so that the transfer can be effected and so that the door can be unlocked, and connections between the bolt releasing mechanism and the shutter for operating the latter.

20. In a registering machine, a register, a shutter normally concealing the register, a no-sale key, and means controlled by said key for causing said shutter to disclose the register.

21. In a registering machine, a register, an operating mechanism therefor, means for normally holding said mechanism against operation, a shutter normally concealing the register, a no-sale key, and means controlled by said key for causing said shutter to disclose the register and for releasing said mechanism.

22. In a cash register, a registering device, a shutter normally concealing said device, a no-sale key, and connections between the said key and shutter for moving the latter to disclose the registering device.

23. In a cash register, a registering device, a shutter for normally concealing the registering device, a special key, means for operating the shutter upon the operation of the special key for disclosing the register, and a second register for showing the number of times the shutter has been operated.

24. In a cash register, a registering device, a shutter for normally concealing the registering device, a no-sale key, means for operating the shutter upon the operation of the no-sale key for disclosing the register, and a second register operatively connected with the said no-sale key and showing the number of times the shutter has been operated.

25. In a cash register, a registering device, a casing having a door opposite said device, means for normally locking said door, a shutter for the said device within said door, and means for simultaneously unlocking said door and operating the shutter for disclosing the registering device.

26. In a cash register, a registering device, a casing having a door opposite said device, means for locking said door, a shutter for the said device within said door, a no-sale key, and connections between said key and the said locking means and between said key and the said shutter whereby, upon the operation of said key, the door is unlocked and the shutter is moved for disclosing the registering device.

27. In a cash register, a registering device, a casing having a door opposite said device, means for locking said door, a shutter for the said device within said door, a no-sale key, connections between said key and the locking means and between said key and said shutter whereby, upon the operation of the key, the door is unlocked and the shutter is moved for disclosing the registering device, and a second registering device for showing the number of times the said door has been unlocked.

28. In a cash register, a series of value, initial and department keys, register operating devices controlled by the value keys, indicator operating devices controlled by all of said keys, a cash drawer, means for locking said drawer in its inner position, connections between the department keys and the drawer-locking means for releasing the drawer when one of the said department keys is depressed, and means for operating said register and indicator operating devices independently of the drawer and with the latter in either its open or closed position.

29. In a combined register, indicator and recorder, having reciprocating depressible setting keys for values, initials and departments, one or more sets of type, a roll of paper, a printing mechanism, a feeding mechanism, an oscillatory main lever for operating both of said mechanisms, and a drawer having means attached thereto for restoring said main operating lever to normal position.

HENRY S. HALLWOOD.

In the presence of—
J. H. FRAVEL,
HARRY SPEER.

---

Copies of this patent may be obtained for five cents each, by addressing the "Commissioner of Patents, Washington, D. C."